（12） United States Patent
Moore et al.

(10) Patent No.: US 11,599,911 B2
(45) Date of Patent: Mar. 7, 2023

(54) METHOD FOR MAPPING AN OBJECT TO A LOCATION IN VIRTUAL SPACE

(71) Applicants: Sony Corporation, Tokyo (JP); SONY EUROPE B.V., Weybridge (GB)

(72) Inventors: Nigel Stuart Moore, Newbury (GB); Nicolas Rose, Eastleigh (GB)

(73) Assignees: Sony Corporation, Tokyo (JP); SONY EUROPE B.V., Weybridge (GB)

( * ) Notice: Subject to any disclaimer, the term of this patent is extended or adjusted under 35 U.S.C. 154(b) by 0 days.

(21) Appl. No.: 16/536,875

(22) Filed: Aug. 9, 2019

(65) Prior Publication Data

US 2020/0051130 A1 Feb. 13, 2020

(30) Foreign Application Priority Data

Aug. 10, 2018 (GB) ...................................... 1813104

(51) Int. Cl.
*G06Q 30/02* (2012.01)
*G06Q 30/0273* (2023.01)
(Continued)

(52) U.S. Cl.
CPC ......... *G06Q 30/0273* (2013.01); *G06F 3/011* (2013.01); *G09G 5/36* (2013.01); *G09G 2354/00* (2013.01)

(58) Field of Classification Search
CPC . G06Q 30/0207–0277; G06Q 30/0273; G06Q 30/0241; G09G 5/26;
(Continued)

(56) References Cited

U.S. PATENT DOCUMENTS 6,549,219 B2    4/2003  Selker
7,117,440 B2   10/2006  Gordon et al.
(Continued)

FOREIGN PATENT DOCUMENTS

KR       10-1510099           4/2015
WO   WO-2011094734 A2 *  8/2011  ............. G06Q 30/02
(Continued)

OTHER PUBLICATIONS

"In-Car Augmented Reality", https://chariesparentnet/in-car-augmented-reality/ retrieved Mar. 26, 2018, 6 pages.
(Continued)

*Primary Examiner* — Thuy N Nguyen
(74) *Attorney, Agent, or Firm* — Oblon, McClelland, Maier & Neustadt, L.L.P.

(57) ABSTRACT

A method of mapping an object to a location in a virtual space, the method comprising assigning to locations in the virtual space a prominence value representing the prominence of an object at the location when the virtual space is viewed by a user, the prominence value being assigned according to a distance from each location to a reference location in the virtual space and at least one physiological characteristic of a user, determining a purchase value for the locations in the virtual space representing a payment required to place an object at respective locations in the virtual space, the purchase value being determined at least according to the prominence value assigned to a respective location in the virtual space and in response to receiving the payment for a location in the virtual space, mapping the object to that location in the virtual space.

19 Claims, 13 Drawing Sheets

(51) Int. Cl.
  *G06F 3/01*  (2006.01)
  *G09G 5/36*  (2006.01)

(58) Field of Classification Search
  CPC ...... G09G 2354/00; G09G 5/36; G06F 3/011;
         G06F 3/012; G06F 3/013; G06F 3/017;
         G06F 3/0346; G06F 3/167; G06T 19/20;
                                    G06T 19/006
  See application file for complete search history.

(56) References Cited

U.S. PATENT DOCUMENTS

| | | | | |
|---|---|---|---|---|
| 7,467,356 | B2 * | 12/2008 | Gettman | G06Q 30/02 715/850 |
| 7,610,233 | B1 * | 10/2009 | Leong | G06Q 10/087 705/28 |
| 7,721,311 | B2 | 5/2010 | Kowald et al. | |
| 10,354,291 | B1 * | 7/2019 | Teller | G06T 19/006 |
| 10,539,797 | B2 * | 1/2020 | Nakashima | G02B 27/0172 |
| 10,768,776 | B1 * | 9/2020 | Roche | G06F 3/04815 |
| 2005/0021472 | A1 * | 1/2005 | Gettman | G06Q 40/04 705/52 |
| 2005/0022139 | A1 * | 1/2005 | Gettman | G06F 16/954 715/811 |
| 2005/0030309 | A1 * | 2/2005 | Gettman | G06F 16/954 345/419 |
| 2005/0086612 | A1 * | 4/2005 | Gettman | G06F 16/954 715/713 |
| 2006/0048189 | A1 | 3/2006 | Park et al. | |
| 2006/0155597 | A1 * | 7/2006 | Gleason | G06Q 30/02 705/14.27 |
| 2007/0216865 | A1 * | 9/2007 | Sabel | A61H 5/00 351/203 |
| 2008/0263460 | A1 * | 10/2008 | Altberg | G06Q 30/02 715/757 |
| 2010/0058213 | A1 | 3/2010 | Higuchi et al. | |
| 2010/0251180 | A1 | 9/2010 | Cragun et al. | |
| 2011/0288914 | A1 * | 11/2011 | Guthrie | G06Q 30/02 705/14.4 |
| 2012/0140040 | A1 * | 6/2012 | Sakurai | G06T 19/006 348/46 |
| 2012/0233000 | A1 * | 9/2012 | Fisher | G06F 16/78 705/14.71 |
| 2012/0293394 | A1 * | 11/2012 | Lahcanski | G02B 27/0093 345/8 |
| 2014/0002444 | A1 * | 1/2014 | Bennett | G06F 3/0304 345/419 |
| 2014/0335953 | A1 * | 11/2014 | Marsland | A63F 13/61 463/31 |
| 2015/0379046 | A1 * | 12/2015 | Sundaresan | G06F 3/04815 707/772 |
| 2016/0171532 | A1 * | 6/2016 | Goyal | G06Q 30/0252 705/14.5 |
| 2016/0189241 | A1 * | 6/2016 | Guldimann | G06Q 30/0272 705/14.68 |
| 2016/0196603 | A1 * | 7/2016 | Perez | G06F 3/16 345/633 |
| 2017/0116667 | A1 * | 4/2017 | High | G06T 19/006 |
| 2018/0004285 | A1 | 1/2018 | Castleman | |
| 2018/0005443 | A1 * | 1/2018 | Poulos | G06F 3/0346 |
| 2018/0158242 | A1 * | 6/2018 | Sugawara | G06F 3/012 |
| 2018/0224658 | A1 * | 8/2018 | Teller | H04H 60/46 |
| 2018/0232952 | A1 * | 8/2018 | Hiranandani | G06Q 10/00 |
| 2019/0079298 | A1 * | 3/2019 | Shoji | H04N 21/8186 |
| 2019/0108686 | A1 * | 4/2019 | Spivack | G06Q 20/123 |
| 2019/0139321 | A1 * | 5/2019 | Kocharlakota | G06F 3/011 |
| 2019/0179509 | A1 * | 6/2019 | Daie | G06F 3/0485 |
| 2019/0272673 | A1 * | 9/2019 | Mathur | G06T 15/20 |

FOREIGN PATENT DOCUMENTS

WO     WO-2018067731 A1 * 10/2017
WO     WO 2018/067731 A1    4/2018

OTHER PUBLICATIONS

International Search Report and Written Opinion dated Oct. 10, 2019, in PCT/GB2019/052158, citings documents AA-AB therein, 15 pages.

* cited by examiner

METHOD FOR MAPPING AN OBJECT TO A LOCATION IN VIRTUAL SPACE

CROSS REFERENCE TO RELATED APPLICATIONS

The present application claims priority to United Kingdom Application 1813104.5 filed on 10 Aug. 2018, the contents of which being incorporated herein by reference in its entirety.

BACKGROUND

Field of the Disclosure

The present disclosure relates to a method for mapping an object to a location in a virtual space.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

A large volume of digital content is becoming available to be accessed by individuals. As the volume of digital content available to an individual increases, a problem becomes how to efficiently navigate through and access the desired digital content. For example, one technique which has been developed which enables a user to navigate through television content is an Electronic Program Guide (EPG). Typically, available television content is displayed in an EPG in a grid format. However, a problem with grid based EPGs is that the amount of information which can be displayed about a given item of digital content becomes very restricted. Furthermore, with increasing access to internet channels, the number of items of digital content which must be displayed in the EPG becomes very large indeed. Navigation through the EPG in order that the desired content may be accessed therefore becomes increasingly slow and cumbersome.

The issue regarding the access and navigation through a large volume of digital content is further exacerbated when a user attempts to navigate digital content in a virtual reality or augmented reality environment. Traditional methods developed for the navigation of digital content, such as the EPG, translate very poorly to the virtual environment. For example, grid based EPGs can appear cluttered owing to the limited virtual space available which can be used to display the EPG and the user can easily become frustrated when seeking to navigate through the digital content. Furthermore, the precise level of control required to navigate through large volumes of digital content in this manner can be difficult to achieve.

It is an aim of the present disclosure to address these issues.

SUMMARY

According to embodiments of the disclosure, a method of mapping an object to a location in a virtual space is provided, the method comprising assigning to locations in the virtual space a prominence value representing the prominence of an object at the location when the virtual space is viewed by a user, the prominence value being assigned according to a distance from each location to a reference location in the virtual space and at least one physiological characteristic of a user, determining a purchase value for the locations in the virtual space representing a payment required to place an object at respective locations in the virtual space, the purchase value being determined at least according to the prominence value assigned to a respective location in the virtual space and in response to receiving the payment for a location in the virtual space, mapping the object to that location in the virtual space.

According to embodiments of the disclosure there is provided an apparatus for mapping an object to a location in a virtual space, the apparatus comprising circuitry configured to assign to locations in the virtual space a prominence value representing the prominence of an object at the location when the virtual space is viewed by a user, the prominence value being assigned according to a distance from each location to a reference location in the virtual space and at least one physiological characteristic of a user, determine a purchase value for the locations in the virtual space representing a payment required to place an object at respective locations in the virtual space, the purchase value being determined at least according to the prominence value assigned to a respective location in the virtual space and in response to receiving the payment for a location in the virtual space, map the object to that location in the virtual space.

According to embodiments of the disclosure there is provided a computer program product comprising instructions which, when the program is executed by a computer, cause the computer to carry out a method of mapping an object to a location in a virtual space, the method comprising assigning to locations in the virtual space a prominence value representing the prominence of an object at the location when the virtual space is viewed by a user, the prominence value being assigned according to a distance from each location to a reference location in the virtual space and at least one physiological characteristic of a user, determining a purchase value for the locations in the virtual space representing a payment required to place an object at respective locations in the virtual space, the purchase value being determined at least according to the prominence value assigned to a respective location in the virtual space, and in response to receiving the payment for a location in the virtual space, mapping the object to that location in the virtual space.

Some embodiments provide, modifying the purchase values of respective locations in the virtual space following the mapping of an object to a location within that virtual space enables restriction of the opportunities of third parties to (unfairly) capitalise upon the prominence of a competitor, thus providing an increased level of certainty to a purchaser that a given object for which payment is received will achieve a certain degree of prominence and exposure to the user. The amount of virtual space that it is comfortable to view without significant effort may be limited. Some embodiments of the disclosure provide effective ways to manage the amount of virtual space.

Furthermore, by mapping an object to a respective location in the virtual space according to a purchase value and received payment information, it becomes possible to ensure that a given object for which the payment is received will have a certain degree of prominence and exposure to the user, even when a large number of objects are displayed in the virtual space on a screen or virtual space of limited size.

Thus, it becomes easier for objects which are more likely to be desirable to a user to be found in a virtual environment of limited available space.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
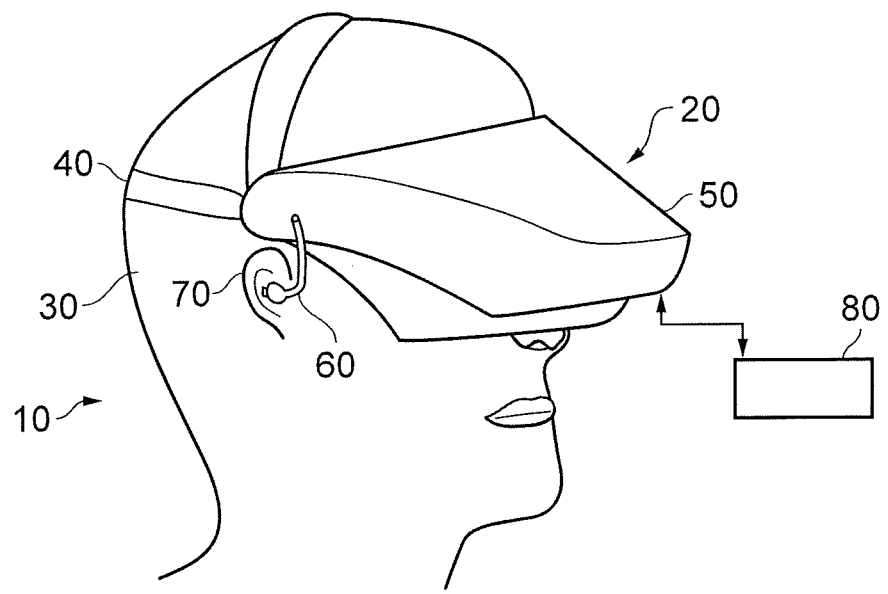
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth®, WiFi® or LTE® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured or one eye may be obscured or the HMD may be arranged such that two eyes may focus on the display portion and that one eye may be able to glance around the display portion into the external environment; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
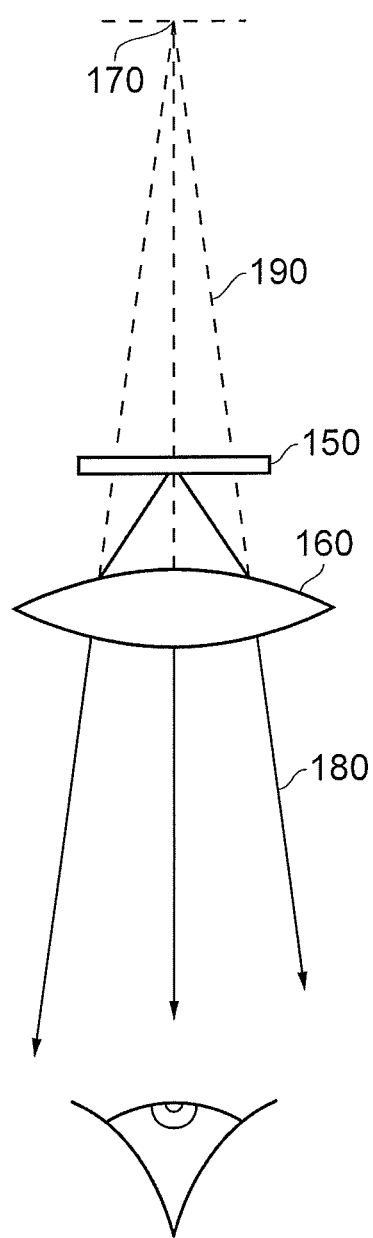
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
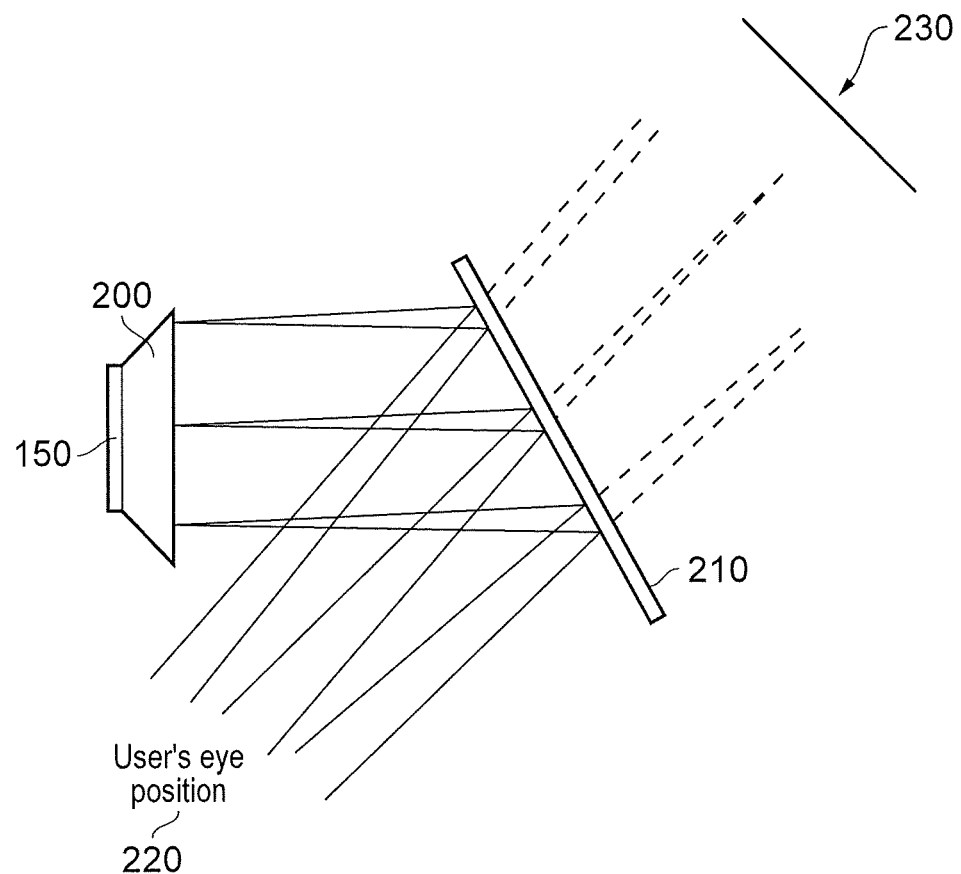
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
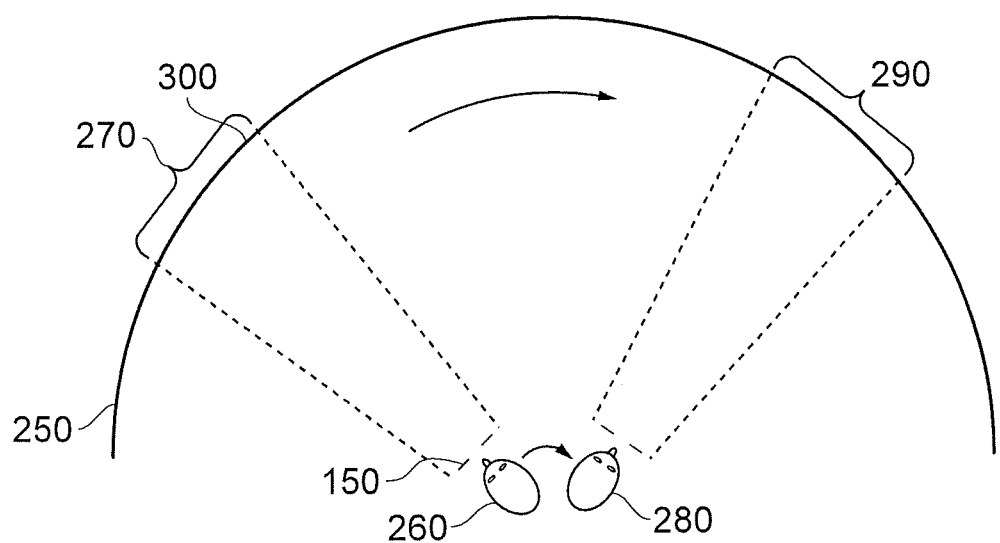
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
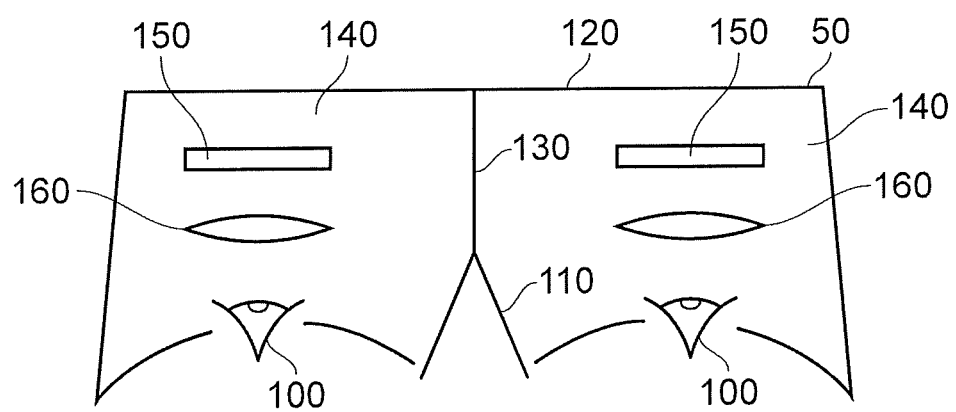
FIG. 2 is a schematic plan view of an HMD.
Figure 7A:
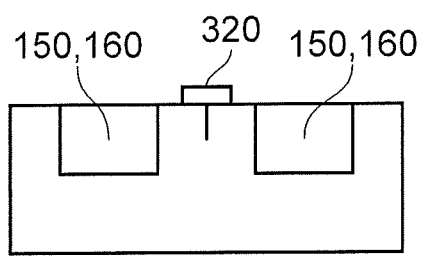
FIGS. 7*a* and 7*b* schematically illustrate HMDs with motion sensing.
Figure 7B:
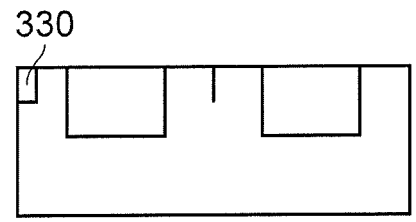

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
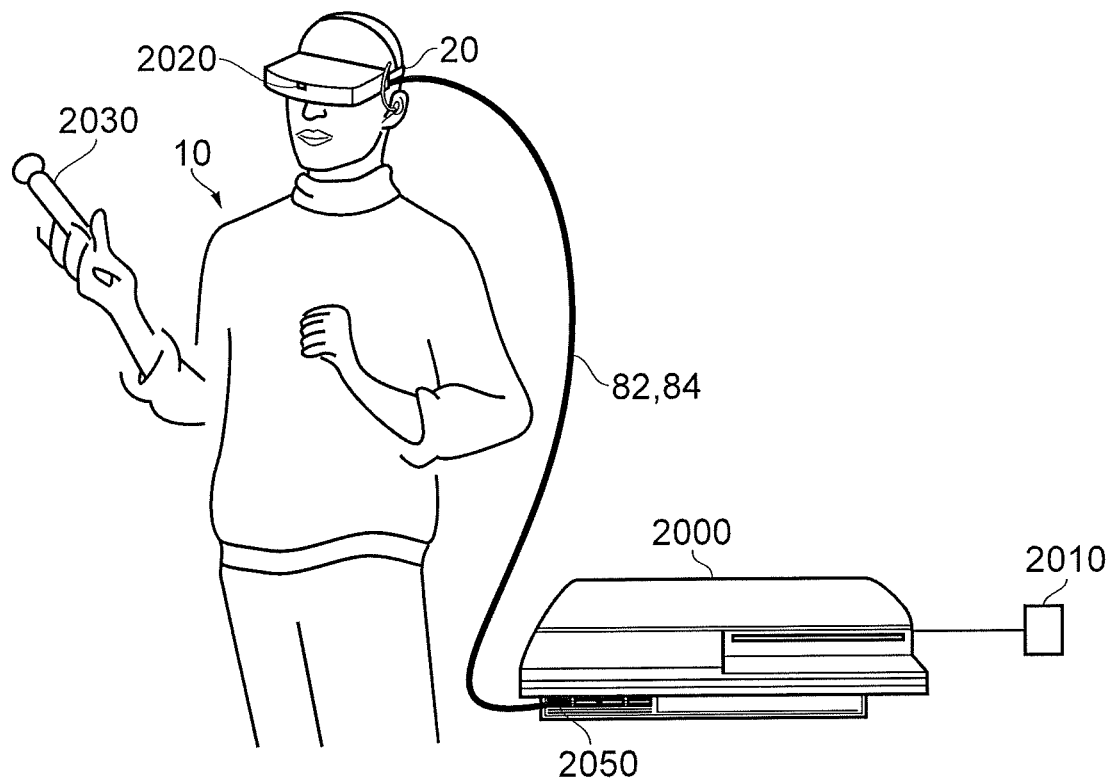
FIGS. 8 and 9 schematically illustrate a user wearing an HMD connected to a Sony® PlayStation 3® games console.

FIG. 8 schematically illustrates a user wearing an HMD connected to a Sony® PlayStation 3® games console 2000 as an example of a base device (corresponding to the external video source 80 of FIG. 1), a further example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 8, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000.

The USB connection from the games console 2000 also provides power to the HMD 20, according to the USB standard.

Figure 9:
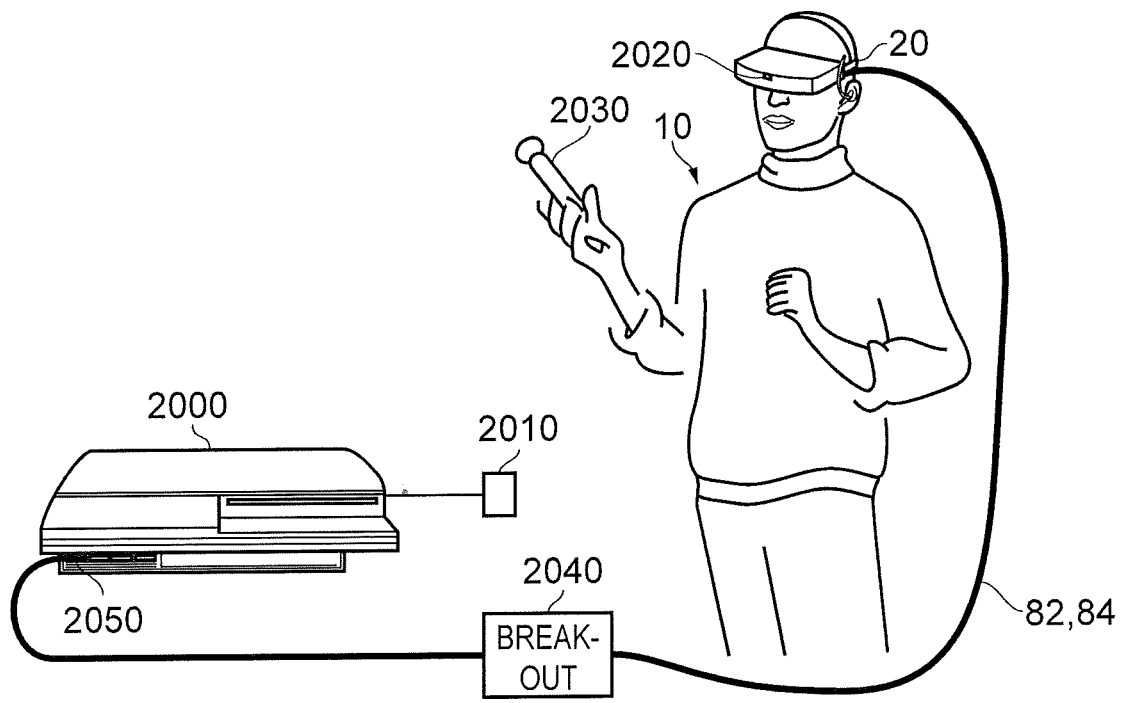

FIG. 9 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

Mapping Objects to a Location in a Virtual Space in Accordance with a Level of Priority:

A method of mapping an object to a location in a virtual space according to the present embodiment may be applied to the navigation by a user through a large number of digital objects, such as television channels, displayed in a virtual environment. In this example, a Logical Channel Number (LCN) is associated with at least some of the television channels. The LCN indicates an ordering of the channels in a known grid based Electronic Program Guide (EPG).

Figure 10:
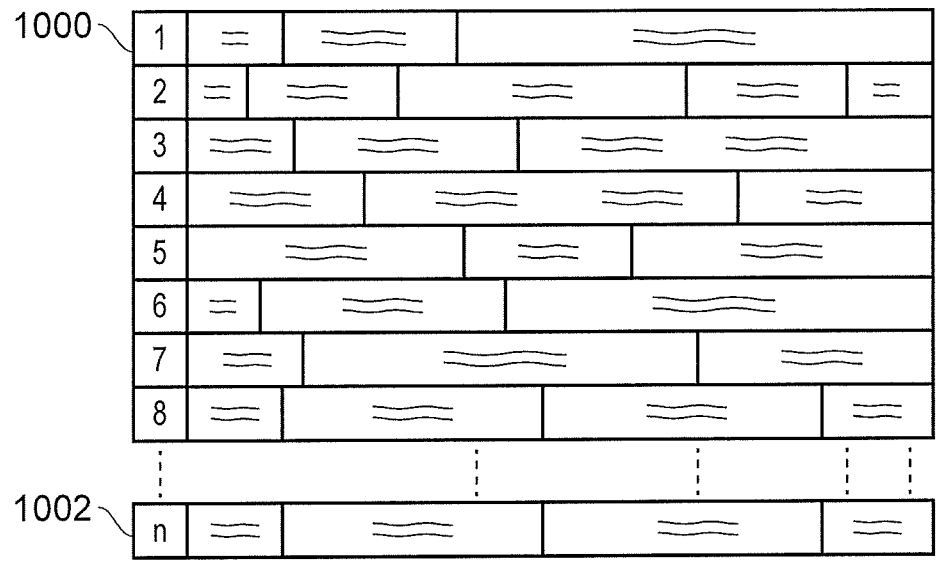
FIG. 10 is an example of a known EPG.

An example of a known grid based EPG is illustrated in FIG. 10. Television channels with a lower LCN appear closer to the beginning of the channel list, and are therefore displayed at the top 1000 of a grid based EPG. In contrast, television channels with a higher LCN appear further away from the top of the channel list (further away from number 1). As such, in a grid based EPG, a channel with a high LCN would be located near the bottom 1002 of the EPG. As the number of channels increases, it becomes difficult for the user to navigate to a desired channel in the grid based EPG. That is, as the number of channels increases, the volume of digital content which must be displayed also increases, including information relating to the channels (such as the currently playing program or the like). For the limited and fixed screen space which is available for display, the increase in the volume of digital content becomes particularly problematic. In a known grid based EPG such as that illustrated in FIG. 10, pertinent information cannot be provided to the user, and the user will become increasingly frustrated with attempts to navigate through the large volume of digital content on the limited space which is available. LCNs are normally provided as part of broadcast service information for at least some channels (services, according to the DVB definition) and television circuitry uses the LCNs to define a channel skipping order and order of the EPG as described. Typically a user of the television receiver can remap services to channel numbers which are stored in memory of the TV receiver to change the order of services which has been determined by LCN.

Figure 11:
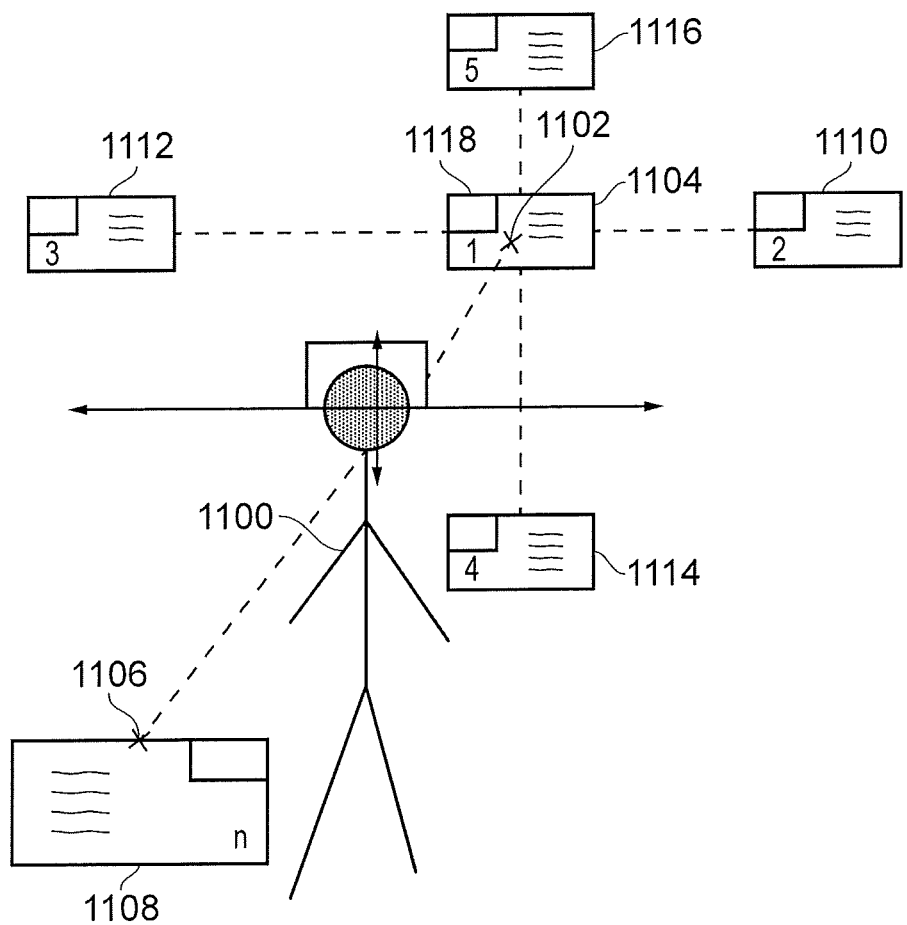
FIG. 11 is an example of mapping an object to a location in a virtual space according to the embodiments of the disclosure.

An example of mapping an object to a location in a virtual space according to the present embodiment is illustrated in FIG. 11. In this example, the virtual space is displayed on a HMD such as that described with reference to FIG. 1. In this example, the television channels are not displayed in a grid based EPG, but instead are mapped to locations through the virtual space around the user in accordance with a priority value associated with each television channel and a prominence value assigned to each location in the virtual space. That is, the user 1100 wearing the HMD will see the television channels positioned at respective locations (1104, 1108, 1110, 1112, 1114, 1116) throughout the virtual space. In this example, priority, or desired ordering, of the television channels in the virtual space is determined in accordance with the LCN associated with each television channel. However, this could be set in accordance with the personal preference of the user, such that their favourite television channel has the highest priority level. It may also be that only a certain number of the television channels have an associated priority level. In this case, those channels with an associated priority level will be positioned at the respective locations with the highest prominence values first, whereas the television channels without an associated priority level could then be positioned in the remaining respective locations in any given order. As illustrated in this example, the television channel is not restricted only to text describing the currently playing program, or future programs, but also includes a box 1118 which displays a preview of the currently playing program.

In this example, the prominence value represents the prominence of a television object at a given location in the virtual space to the user 1100, and is assigned in accordance with a distance of each location from a reference location in the virtual space and a physiological characteristic of the user 1100. In this example, the reference location is the location 1102 directly in front of the user 1100 in the virtual space when they are in a neutral position, and as such, represents the most prominent location in the virtual space. The television channel with the lowest LCN is thus mapped to this reference location.

It is easier for a user to rotate their head left and right when wearing the HMD than it is for them to look up and down. The comfortable range of motion can be calibrated for each user, and this is described in further detail below. Because of this restricted range of motion, the prominence of a television channel at a given distance from the central location in front of the user in a horizontal direction will be higher than a television channel at the same distance from the central location in a virtual direction. Therefore, in this example, the television channels with LCN 2 and LCN 3 are mapped to locations 1110 and 1112 respectively, while television channels with LCN 4 and 5 are mapped to location 1114 and 1116 respectively in the virtual space. In embodiments it is acknowledged, that comfortable range of motion is further to the left and the right than up and down and comfortable further up than it is down. At such a location to the top right or left may be more prominent than a location to the bottom right or left for the same displacement from a central location. The comfortable range of motion may correspond approximately to a concave hexagon, the concave portion representing the comfort of looking downwards more easily to the left and right than it is straight down in line with one's chin. For some users it may be that it is relatively less easy to turn one's neck to the left than to the right (or vice versa). Locations may be arranged correspondingly.

The location 1106 located directly behind the user in this example is the location at which an object at that location will have the lowest prominence to a user. As such, in this example, the television channel 1108 with the highest LCN is mapped to this location in the virtual space.

While only a small number of television channels are described in this example, it will be appreciated that this method of mapping television channels to respective locations in the virtual space can be applied to any number of television channels.

By mapping each object to the respective location in the virtual space according to the priority level associated with at least some of the objects and the prominence value assigned to the virtual space, it becomes possible to easily navigate a large number of objects since the objects which are of higher priority (or increased interest) are mapped to locations within the virtual space having increased prominence. In embodiments, the priority may be determined by the user. In embodiments priority may be determined computationally by a processor.

For example, when the priority of objects is set in accordance with user preference, the user 1100 will find that their favourite television channel is located at the most prominent location 1102 in the virtual space, and can readily be accessed. Television channels which the user 1000 has a lower preference towards can still be navigated to with reduced complexity when compared to the grid based EPG, but do not take precedent over the user's favourite television channels.

In this example using the HMD, by moving their head, the user is able to look around the virtual space. It will be appreciated that it may be that only a portion of the virtual space be visible to the user at any given time, with that portion of the virtual space corresponding to the current view point of the user in the virtual space. Furthermore, according to this example, as the user moves their head around the virtual space, they are able to select a television channel out of the plurality of television channels displayed in the virtual space. In this example using the HMD, the user can select a television channel out of the plurality of televisions channels in the virtual space by providing an additional input gesture or command when looking at the object they wish to select.

Furthermore, in this example, when the user selects a television channel, that channel moves towards the central location 1102, and media content associated with that television channel, such as the currently broadcast television program, starts to play, such that the user can enjoy watching their chosen television channel in the virtual space. However, in other examples, when the user selects a television channel, of a given genre, other channels having that genre (or programs, events according to DVB definitions, predominantly of that genre) could then be displayed in the regions of the virtual space having the highest prominence. Navigation through the virtual space, and thus the digital object, by the user is improved. That is, in contrast to known grid based EPGs or the like, by mapping the digital objects to a location in the limited size virtual space or display screen as according to the present embodiment, the most pertinent information from a large volume of digital content can be provided to a user, while improving access and navigation through the large volume of digital content.

Figure 12A:
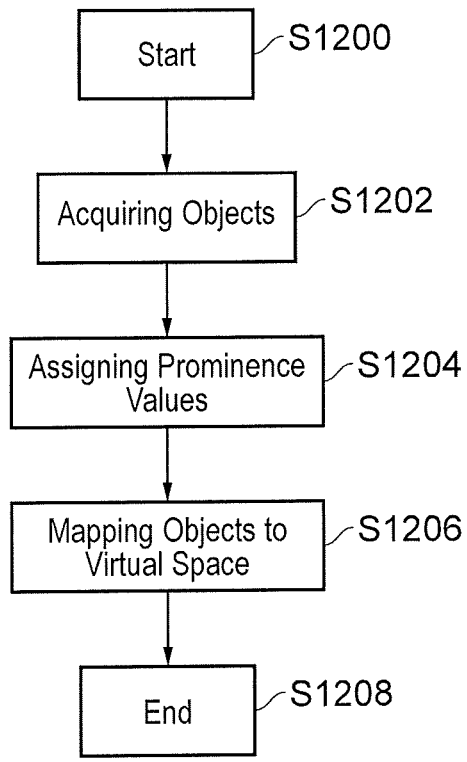
FIG. 12A illustrates a flow chart of a method of mapping an object to a location in a virtual space according to an embodiment of the disclosure.

FIG. 12A illustrates a flow chart of a method of mapping an object to a location in a virtual space according to the present embodiment of the disclosure. The method starts at step S1200 and proceeds to step S1202. In step S1202, the method comprises acquiring a plurality of objects which are to be mapped to respective locations in a virtual space. In step S1204, the method comprises assigning each respective location in the virtual space a prominence value representing the prominence of an object at the location when the virtual space is viewed by a user, the prominence value being assigned according to a distance of each location from a reference location in the virtual space and at least one physiological characteristic of a user. In step S1206 the method comprises mapping each object to a respective location in the virtual space according to the priority level associated with at least some of the objects and the prominence value assigned to each respective location in the virtual space.

Figure 12B:
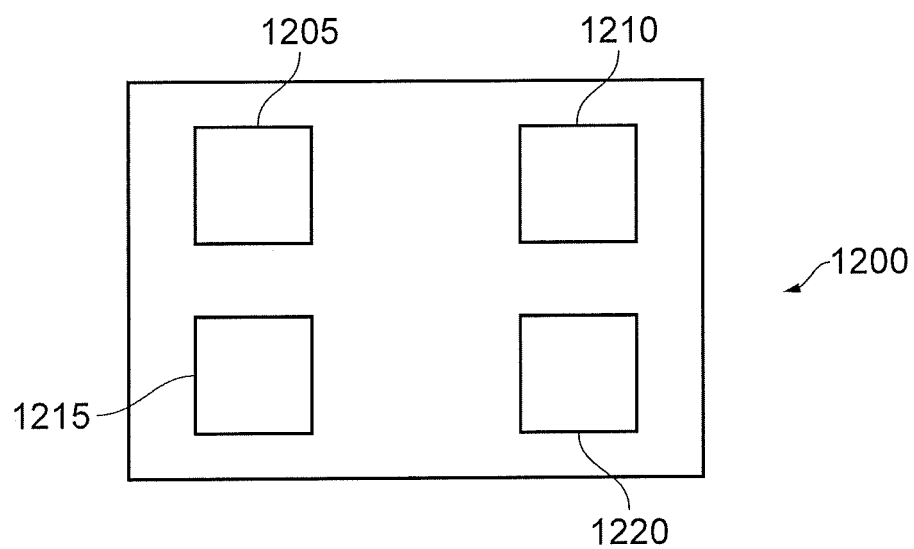
FIG. 12B shows a block diagram of a device 1200 for mapping an object to a location in a virtual space according to embodiments of the disclosure.

The method and method steps according to the present embodiment are described in more detail below. FIG. 12B shows a block diagram of a device 1200 for mapping an object to a location in a virtual space according to embodiments of the disclosure. The device 1200 includes a control device processor 1205. The control device processor 1205 is typically embodied as processor circuitry such as a microprocessor which is configured to operate using computer readable code. The control device processor 1205 controls the operation of the device 1200 using the computer readable code. Of course, the control device processor 1205 may be embodied as hardware (such as an Application Specific Integrated Circuit or the like).

Additionally connected to the control device processor 1205 is control device storage 1210. The control device storage 1210 is a computer readable storage medium (such as an optically readable, magnetically readable or solid state). The control device storage 1210 is configured to store the computer readable code using which the control device processor 1205 operates. In addition, user profiles and various data structures are stored in the control device storage 1210.

Additionally connected to the control device processor 1205 is control device communication circuitry 1215. The control device communication circuitry 1215 is configured to communicate with other devices which as may be required according to embodiments of the disclosure. This communication may be over a wired network (such as an Ethernet network) or may be over a wireless network (such as a WiFi network).

Finally, control device display circuitry 1220 is connected to the control device processor 1205. The control device display circuitry 1220 is configured to display, to a user, objects which have been mapped to locations in the virtual space in accordance with embodiments of the disclosure. Alternatively or additionally, the control device display circuitry 1220 may interact with an Augmented Reality (AR) system or a Virtual Reality (VR) system worn by a user as described with reference to FIGS. 1, 8 and 9 of the present disclosure.

Acquiring Objects:

While the objects according to the above described example, with reference to FIG. 11, are television channels, it will be appreciated that the type of object which is acquired in step S2102 is not limited in this respect. For example, the objects could relate to a number of different types of media object including television channel objects, application objects, video and/or audio and/or game streaming service objects, video game objects, photo objects, video objects or the like. In one example, the type of object which is acquired could be based on a user selection. Alternatively, the type of object could be selected based on the context of operation (if the user opens a television guide application, then the type of object could be television channels which are available to the user). An individual object may itself comprise a mixture of sound, pictures, videos or text for example. An object may be an icon representing for example a channel. The icon need to be static and may comprise video. The video may be currently transmitted video or a processed version thereof.

For example, as described with reference to FIG. 11, a television channel object can display text describing the current program and future programs to be displayed on that channel, alongside a clip or mini-video preview of the currently playing program. These may be sub-pictures. For example a stream may carry sub-pictures for multiple channels concurrently and a particular sub-stream may be demultiplexed by circuitry for display. As a further example, game type objects could comprise a preview, sample or description of a game a user has purchased or may wish to purchase and play in the virtual space.

Furthermore, the plurality of objects need not be of a single type (games for example) but may be any mixture of the objects (games and photos or games, photos and videos for example). As such, the plurality of objects can represent a library of digital content owned by the user.

The plurality of objects could further relate to applications which can be launched by the user. These could be applications which the user has previously installed on their device, or they could be web-based applications which the user can launch. The applications which are acquired could be customizable by the user, or they could be fixed pre-installed applications. As an example, applications could relate to photo editing applications, text editing applications, web browsers, email applications or the like. The objects might also relate to different menu options which can be selected by the user.

Finally, for example, the plurality of objects which are to be mapped to respective locations in the virtual space could relate to floor numbers or shopping categories in a virtual department store, and the user could thus navigate through the virtual department store. Priority could be determined by the age, sex or interests of a user. Such information may be pre-stored in memory for example as entered by a user, or may be estimated computationally by a processor. Other types of objects could relate to different departments within the department store, and as such, the user could navigate through the departments of the department store according to the present embodiment. It will be understood that the types of objects which may be used is not limited to the above examples, and any digital objects which are to be mapped to respective locations in a virtual space may be acquired.

Priority Level:

The priority level is a value which indicates a relative ordering of the plurality of objects. This ordering could be assigned by a user preference, and need not be acquired at the time when the plurality of objects is acquired. Such user preference could relate to objects which the user frequently accesses, objects which the user has recently accessed in the past, or objects which the user has expressed particular interest. For example, the user could have indicated that a given object is a 'favourite' object or the like. Furthermore, an object which the user has expressed minimal interest in could be an object which is assigned a lower priority level. The priority level assigned to objects with respect to the user preference can be fixed for a period of time, or can continually adapt in accordance with use or user behaviour.

As an example, consider the situation depicted in FIG. 11. In this example, the television channel 1104 is the television channel which the user had indicated was their favourite channel. However, over the course of use of the HMD, the user accesses the television channel 1112 more frequently than that of 1104. Accordingly, the priority level associated with the television channel objects 1104 and 1112 is adjusted accordingly, such that television channel 1112 is mapped to a location of increased prominence to the user. In this manner, the method of mapping objects according to the present embodiment adapts to user behaviour.

Alternatively, or in addition, the priority level could be set in accordance with an external priority level. That is, the plurality of objects which are acquired may have a natural or intended ordering. For example, in the case that the objects which are acquired relate to objects A, B and C, it may be that there is a priority level associated with the objects such that the objects remain in the order A, B, C. Alternatively, the priority level may indicate that any other ordering of the plurality of objects is required. The priority level may be acquired at the same time as the acquiring of the plurality of objects, or may be stored in advance or received after the objects are required.

For example, as described above, if the objects represent television channels, the external priority levels associated with at least some of the objects may represent the logical channel number (LCN) assigned to each channel. In this manner, the intended ordering of the objects would reflect the ordering of the television channels displayed in known EPGs.

Furthermore, if no priority level is received at any stage before the plurality of objects which are to be mapped to respective locations in a virtual space are mapped to the respective locations in the virtual space, then the method may further comprise assigning a default priority level to the objects. Such a default priority level could be assigned simply based on the order in which the plurality of objects were acquired, or the default priority level could be assigned at random. The priority level could be determined by a commercial relationship. An Over-The-Top internet video provider may pay to have their object a particular priority level.

Alternatively or in addition, the priority level may be assigned to the plurality of objects such that a subset of the plurality of objects are mapped to respective locations in a specific area of the virtual space. In other words, certain objects of the plurality of objects could be assigned priority levels such that they are intended to be clustered around a certain location within the virtual space. Referring to television channels by means of an example, it may be that the priority levels are assigned such that all the channels from a particular provider are clustered in a particular location in the virtual space. Alternatively, the priority level could be assigned so that all applications or channels of a given type or genre are clustered in a particular location in the virtual space. Assigning priority level in this manner such that a subset of the plurality of objects are mapped to respective locations in a particular area of the virtual space improves the ability of the user to efficiently navigate content of a given type.

In the case that one or more objects share the same priority level, the method could further comprise modifying the priority level of at least one of the one or more objects such that each object has a separate priority level. For example, in the case that an object A and an object B both have the same priority level of 1, the method could comprise modifying the priority level of either, or both of the objects A and B such that their respective priority levels were no longer the same. The reassignment of priority level in this case could be performed by a random selection, or based upon the order in which the objects were acquired for example or an order of time spent using or watching information relating to those objects. Their priority level may be determined by user behaviour on another computing platform or device and not in the presently described VR environment/system. For example, priority level could be based on a user's interaction with applications on a mobile handset. Information relating to the interaction can be transferred to an interface of the VR system. It will be appreciated that other methods of reassigning priority level in the case of a conflict between priority levels could be used in accordance with the present disclosure.

Assigning Prominence Values:

The prominence value according to the present embodiment defines the prominence an object placed at a given location in the virtual space would appear to have to a user viewing the virtual space, For example, if the object is placed at a reference location, wherein the reference location is a location in the virtual space directly in front of the user or where the user is currently looking for example, then the object would appear to be very prominent in the virtual space, and would be readily noticed by the user. In contrast, if the object is placed at a distance further from the reference location, then the object would appear to be less prominent and would not be so readily noticed by the user. The more prominent an object at a given location would be to a user viewing the virtual space, the higher the prominence value would be.

The method may comprise assigning locations in the virtual space prominence values at any level of granularity. For example, the size of each location in the virtual space which is assigned a priority level could be determined based upon the size of the objects which are to be mapped to the respective locations in the virtual space. Alternatively, the size of each location in the virtual space which is assigned a priority level could be based upon the number of objects which are to be mapped to the respective locations in the virtual space. Furthermore, the size of each location could be based upon the available processing power of the display device displaying the virtual space. In the example of FIG. 11, the relevant processing power would therefore be that of the HMD used by the user 1100.

According to the present embodiment of the disclosure, the prominence value is assigned according to a distance of each location from a reference location in the virtual space and at least one physiological characteristic of a user, as demonstrated in the example of FIG. 11. With regards to the reference location, it will be understood that such reference location may be set at any location within the virtual space, but in general represents an area of the virtual space which has the highest initial prominence value. Therefore, as described above, if an object is placed at a large distance from the reference location then the prominence value of that object will be low. When assigning a prominence value according to embodiments of the disclosure, the prominence value may depend on the linear distance of each respective location from the reference location, or instead depend on a non-linear mapping between the distance of each location from the reference location and the prominence value assigned to each location within the virtual space.

Figure 13:
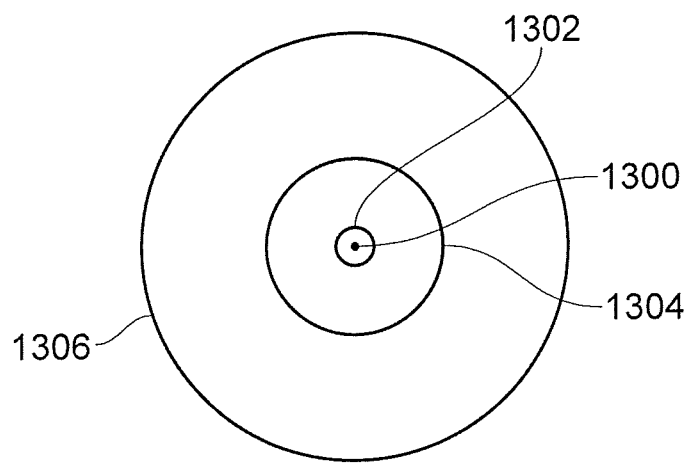
FIG. 13 depicts the distribution of prominence values in a two-dimensional space according to embodiments of the disclosure.

FIG. 13 depicts the distribution of prominence values in a two-dimensional space according to embodiments of the disclosure. Here, the reference location 1300 is located at the centre of the virtual space (that is, it is located directly in front of a user who is viewing the virtual space). The prominence value is thus determined in accordance with the distance of each respective location in the virtual space from the reference location 1300. In this example, the virtual space is categorised into regions, such that region 1302 encompassing the reference location 1300 is the region of highest prominence, region 1304 is the region of medium prominence and region 1306 is the region of lowest prominence. It will be appreciated that while the virtual space is depicted in regions in this example, there may of course be a continuum of prominence values assigned to the virtual space. Furthermore, while a two dimensional virtual space is depicted in FIG. 13, the present disclosure is not so limited. For example, the virtual space may be a three dimensional virtual space, and the prominence values may be distributed in relation to a sphere around the reference location 1300.

Figure 14:
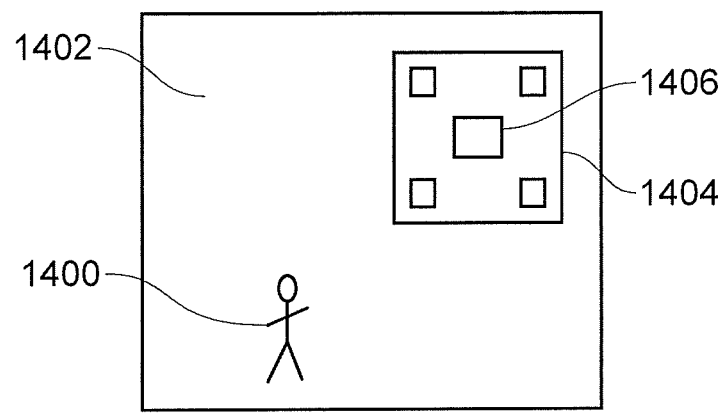
FIG. 14 depicts a situation where prominence values are assigned to a two-dimensional plane within a three-dimensional space according to embodiments of the disclosure.

However, even within a three-dimensional space it will be understood that the respective locations within the virtual space may be a respective location on a two-dimensional surface within the virtual space. That is, for example, while the virtual space itself is three-dimensional, the depth of the respective locations within the three-dimensional space may be fixed such that the objects are displayed on a surface within the three-dimensional space. FIG. 14 depicts a situation where prominence values are assigned to a two-dimensional plane within a three-dimensional space according to embodiments of the disclosure. User 1400 represents the view point of a user in a three-dimensional virtual space 1402. Surface 1404 in the virtual space 1402 is restricted to two-dimensions. A plurality of objects 1406 are shown mapped to the two-dimensional surface 1404 within the virtual space 1402. In embodiments prominence values may relate to planes or surfaces at different depths of virtual displacements from a user.

Physiological Characteristics:

As stated above, assigning the prominence value representing the prominence of an object at the location when the virtual space is viewed by the user according to embodiments of the disclosure further comprises consideration of at least one physiological characteristic of the user. That is, the prominence value assigned to each location in the virtual space varies in accordance with at least one physiological characteristic of a user who is viewing the virtual space. The physiological characteristic of the user may include characteristics related to neck flexibility of the user or peripheral vision range of the user for example. That is, the physiological characteristic may relate to the range of motion which the user may comfortably move their neck through.

Figure 15:
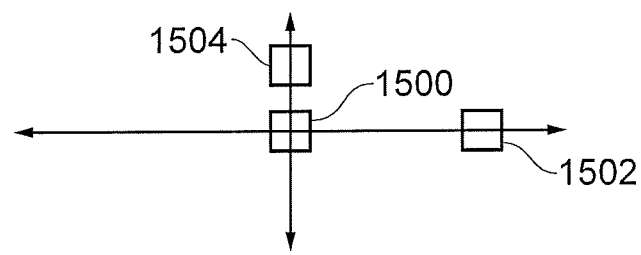
FIG. 15 depicts a physiological characteristic according to embodiments of the disclosure.

FIG. 15 depicts a physiological characteristic according to embodiments of the disclosure. The range of motion a typical user may move their neck through varies according to the plane of the rotation. That is, from a neutral neck position (looking directly forwards) It is easier for a user to rotate their head in a left to right (or horizontal) direction, as opposed to rotation in a up down (or vertical) direction. The typical user therefore finds that it is easier to rotate their neck to look a position 1502 on the horizontal axis, than it is to rotate their neck to position 1504 on the vertical axis. That is, the range of motion through which a typical user may comfortably rotate their head in a horizontal direction is greater than the range of motion through which a typical user may comfortably rotate their head in a vertical direction.

Consider an object located at a distance D from a reference location in a virtual space. It would be easier for the user to rotate their head to view an object at a location D in the virtual space in a horizontal direction from the reference location than it would be for the user to rotate their head in order to view the same object at the same distance D from the same reference location in a virtual direction. In other words, a physiological characteristic of the user, such as that shown in FIG. 15, must be combined with the prominence distribution based on the distance of the respective location from the reference location (as shown in FIG. 13) in order to assign each location in the virtual space a prominence value of an object at the location when the virtual space is viewed by a user.

Figure 16:
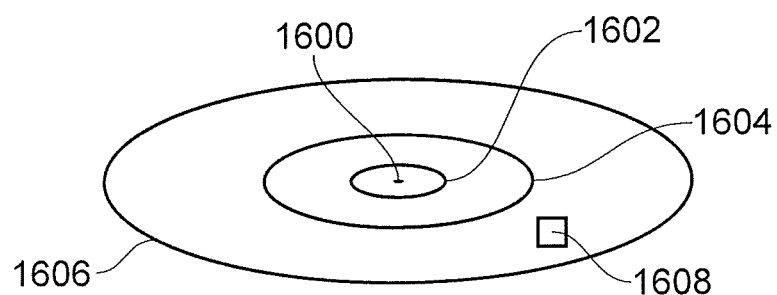
FIG. 16 demonstrates an exemplary prominence distribution in a virtual space according to embodiments of the disclosure.

FIG. 16 demonstrates an exemplary prominence distribution in a virtual space according to embodiments of the disclosure. While distributing prominence values around the reference location solely based on the distance from a central reference location will produce a spherical or radial distribution of prominence values around the reference location, as can be seen in the example of FIG. 16, assigning a prominence value according to a distance of each location from a reference location 1600 in the virtual space and at least one physiological characteristic of a user creates a non-isotropic distribution of the prominence value of each respective location around the reference location 1600. That is, the prominence value around the reference location is no longer evenly or spherically distributed around the reference location. Rather, the prominence value is distributed around the reference location in accordance with the physiological characteristic of the user such that the regions in the virtual space where are easier for the user to view are the regions which are accorded the highest prominence value. In other words, for example, since the flexibility of the human neck is not isotropic, as described above, the distribution of prominence values around the reference location does not form concentric circles of equidistance from the reference location. Instead, in this example, the distribution of the prominence values become elongated along a first axis when compared to the distribution of the prominence values along a second axis in accordance with the physiological characteristic of the user (such as the neck flexibility).

Therefore, as described with reference to FIG. 13, the highest prominence region is the region 1602 which encompasses reference location 1600. Regions 1604 and 1606 represent regions of medium and low prominence values respectively. While the virtual space in FIG. 16 is depicted in two dimensions, it will be understood that a similar non-isotropic, or non-spherical, distribution of the prominence value around the reference location 1600 is achieved in a three dimensional virtual space. Thus, according to the present disclosure, the prominence value of locations, at a fixed distance from the reference location, which are easier for the user to view are enhanced relative to the prominence value of those locations at that fixed distance from the reference location which are more difficult for the user to view in accordance with a physiological characteristic of the user.

Figure 17:
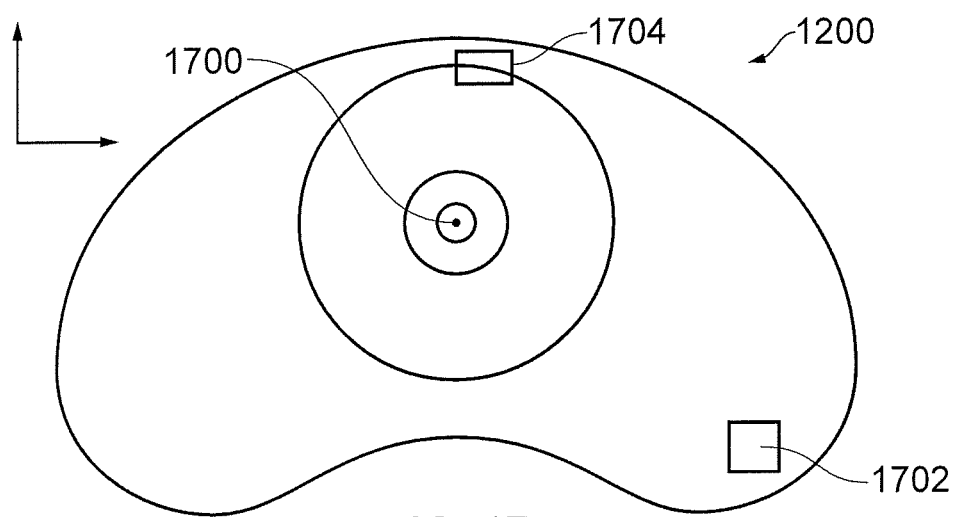
FIG. 17 depicts a physiological characteristic according to embodiments of the disclosure.

FIG. 17 depicts a physiological characteristic according to embodiments of the disclosure. In the example of FIG. 17, the physiological characteristic of the user may relate to the peripheral vision of the user. The physiological characteristic depicted in FIG. 17 may be used alternatively or in addition to that depicted in FIG. 15. It can be seen that the peripheral vision range of the user extends further from a central location 1700 towards regions such as 1702 in a lower portion of the distribution than it does in an upward direction such as location 1704. Accordingly, the prominence value representing the prominence of an object at the location when the virtual space is viewed by a user will be affected accordingly.

It will be understood that the present disclosure is not intended to be limited only to these examples of a physiological characteristic of the user, and any such physiological characteristic of the user which affects the prominence value distribution may be taken into account when assigning the prominence value representing the prominence of an object at a location when the virtual space is viewed by a user according to the present disclosure. For example, characteristics regarding the user's eyesight may be taken into account when assigning the prominence values to the respective locations, such as whether the user is long or short sighted. For a short sighted user, objects at a depth beyond a given depth will appear less prominent than they would for a user who is not short sighted for example. There may be other user preferences applied, such a font, a text size, and whether or not any parallax or perspective correction should be applied to objects rendered at positions further away from a reference location.

It will further be understood that a combination of physiological characteristics could be used in accordance with the present disclosure. For example, both the user's neck flexibility and peripheral vision could be used as physiological characteristics according to the present disclosure, or indeed any other combination of physiological characteristics. Furthermore, according to the present disclosure, these physiological characteristics could be applied independently, or could be applied in combination by calculating an average value from the independent physiological characteristics. When applied in combination through an averaging of the independent physiological characteristics, a weighting factor may be applied in order to increase the relative strength or importance of one or more of the individual physiological characteristics.

By assigning each respective location in the virtual space a prominence value representing the prominence of an object at the location when the virtual space is viewed by a user, the prominence value being assigned according to a distance of each location from a reference location in the virtual space and at least one physiological characteristic of a user as according to the embodiments of the disclosure it is possible to improve the assignment of prominence values through the virtual space such that a more realistic distribution of prominence values for a given user is obtained.

Mapping Objects to Virtual Space:

As described above, once the prominence value has been assigned to each respective location in the virtual space, the objects will then be mapped to their respective locations in the virtual space in accordance with the prominence value and the at least one physiological characteristic. It will be appreciated that there are a number of ways in which the mapping between the priority level associated with at least some of the objects and the prominence value assigned to each location may be performed. For example, mapping each object to the respective location in the virtual space according to the priority level associated with at least some of the objects and the prominence value assigned to each respective location in the virtual space comprises mapping the object with the highest priority level to the respective location with the highest prominence value.

Figure 18:
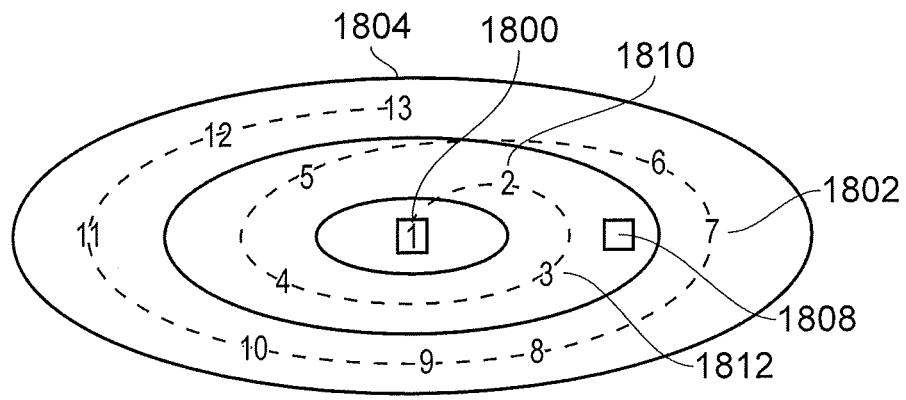
FIG. 18 demonstrates a method of a mapping each object to a location within the virtual space according to embodiments of the disclosure.

FIG. 18 demonstrates a method of a mapping each object to a respective location within the virtual space according to embodiments of the disclosure. In this exemplary mapping, the objects are mapped to the virtual space in accordance with their priority level and the prominence value assigned to each location in a spiral based mapping. That is, the object of the plurality of objects with the highest priority value is mapped to the reference location 1800. The plurality of objects are then mapped in an outward spiral according to decreasing priority value. Mapping the plurality of objects to the virtual space in this manner ensures that the objects which have the higher priority level are displayed in a position which has an increased level of prominence. In the case where only a certain number of objects have a priority level, those objects without a priority level will be assigned to the least prominent locations in the virtual space.

Even though the distance between an object at location 1802 and the reference location 1800 is greater than the distance between an object at location 1804 and the reference location 1800, because of the method of assigning the prominence value to each location based on both the distance from the reference location and the at least one characteristic of the user, an object mapped to a location 1802 is more prominent to a user when a user is viewing the virtual space than an object mapped to a location 1804. It will be understood that such a mapping represents one such mapping which can be used in accordance with the present disclosure, and other mappings between the priority level associated with at least some of the objects and the prominence value assigned to each respective location may be used. In embodiments, the locations are arranged in a spiral from the reference position. In embodiments the objects are arranged about concentric ellipses from the reference position. In embodiments, the objects are arranged about concentric irregular shapes such as in FIG. 17. The outer irregular shape for example may represent the consistent extremity to which it is comfortable to move the neck. Inner irregular shapes may or may not be scaled versions of the outer irregular shape.

According to the present embodiment of the disclosure, the mapping of each object to the respective location in the virtual space according to the priority level associated with at least some of the objects and the prominence value assigned to each location in the virtual space may be updated after a predetermined time or in accordance with a user preference. In this manner, when the mapping is updated the mapping of the objects may change in accordance with a change in the priority level as described above. By updating the mapping after a predetermined time, it can be ensured that the mapping of the objects in the virtual space will not change at too high a frequency, which might frustrate the user. Alternatively or in addition, changing the mapping in accordance with a user preference ensures that the user can decide when the mapping should be updated, such that if the priority level associated with at least some of the objects changes (owing to a change in user interest for example) the mapping can be updated to reflect this change. Circuitry may be controlled such that a user can reserve some positions for certain objects such that their position is predictable even if updating occurs, making them easier to find.

By mapping each object to the respective location in the virtual space according to the priority level associated with at least some of the objects and the prominence value assigned to each location in the virtual space as according to the present embodiment, it becomes possible to easily navigate a large number of objects since the objects which are of higher priority (or increased interest) are mapped to locations within the virtual space having increased prominence. The content most likely desired by a user, where the priority level is set in accordance with use preference as described above, may therefore be accessed quicker and easier. User frustration is thus reduced.

Figure 19:
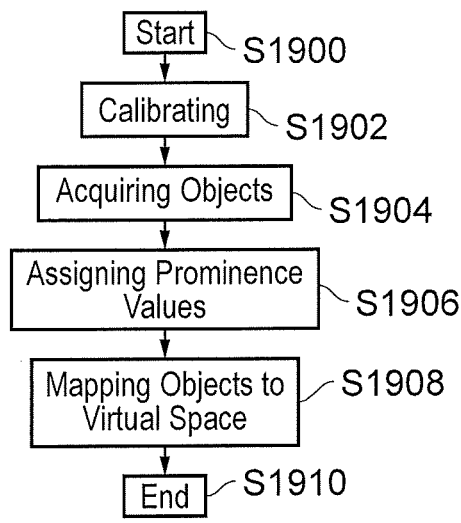
FIG. 19 illustrates a flow chart of a method of mapping an object to a location in a virtual space according to an embodiment of the disclosure.

FIG. 19 illustrates a flow chart of a method of mapping an object to a location in a virtual space according to an embodiment of the disclosure. Here, steps S1904 to S1910 are the same as steps S1202 to S1208 respectively described above with reference to FIG. 12A, and so, for brevity, a repetition of those steps will not be included at this stage.

Step S1902 is a step of performing an initial calibration in order to determine the physiological characteristic of the user. That is, while it will be appreciated that a default physiological characteristic representative of a generic user may be used to effect (such as those described with reference to FIGS. 15 and 17) there may be variation between the physiological characteristics of different users. By performing an initial calibration in order to determine the physiological characteristic of the user prior to performing the mapping described with reference to FIG. 12A, it is possible to further improve the mapping of the plurality of objects to respective locations in the virtual space such that objects with the highest priority level are mapped to respective locations which have the highest prominence values for a given user.

The initial calibration may be performed a single time, such as when a user first uses the device implementing the method of FIG. 19. The calibration of the physiological characteristics may then be stored in a memory, such that they can be accessed when the user uses the device at a later stage. Alternatively or in addition, the calibration of the physiological characteristic may be stored against a user profile, such that each user performs an individual calibration of the physiological characteristic. In this case, the calibration of the physiological characteristic used would vary depending upon the user who is currently using the device.

The initial calibration may also be performed each time the device implementing the method of FIG. 19 is used, after a certain amount of time has expired or after a certain number of uses of the device. It may also be possible for the user to access a menu such that they can request the calibration is to be updated.

It will be appreciated that the manner of performing the initial calibration depends on the physiological parameter of the user which is being calibrated. Furthermore, for each physiological parameter, there may be a number of processes which could be performed in order to calibrate that parameter.

For example, the physiological parameter may relate to related to neck flexibility of the user as demonstrated with reference to FIG. 15. In order to perform the calibration, the user could be asked to rotate their head through the full comfortable range of motion along a given axis. The user could indicate that they have reached the end of the comfortable range by pausing at a given position for a predetermined time, performing an input gesture or the like. By repeating the calibration along a number axes it is possible to perform a calibration of the physiological characteristic of the user.

In the case whereby the display device corresponds to a virtual reality or an augmented reality headset as described above, the rotation of the user's head could be detected by the headset itself. Alternatively, if the display device corresponds to a two-dimensional display device screen such as a television screen, a computer screen an image projected onto a wall from a projector or the like, then the rotation of the user's head could be monitored by a camera for example. Alternatively, an object could be placed on the screen at a number of locations, and the user could be asked to rate the level of comfort of rotation of their neck at each location. Accordingly, a calibration of the physiological characteristic for the user could be obtained.

A calibration for the peripheral vision range of the user could be performed by moving an object through the virtual space, and asking a user to indicate, without rotating their head, when that object stops being visible. Alternatively, an object could be placed at a number of discrete locations, and the user could be asked, again without rotating their head from an initial position, whether that object is visible or not at each location. The user could also indicate a level of visibility, such as poor visibility, medium visibility and good visibility or the like.

As stated above, the form of the calibration will depend upon the physiological characteristic of the user which is being calibrated. Furthermore, it will be appreciated that the above examples of a calibration mechanism are provided as examples which could be used according to embodiments of the disclosure, and that other methods of calibration could be used alone or in combination with the above in accordance with the present disclosure.

Figure 20:
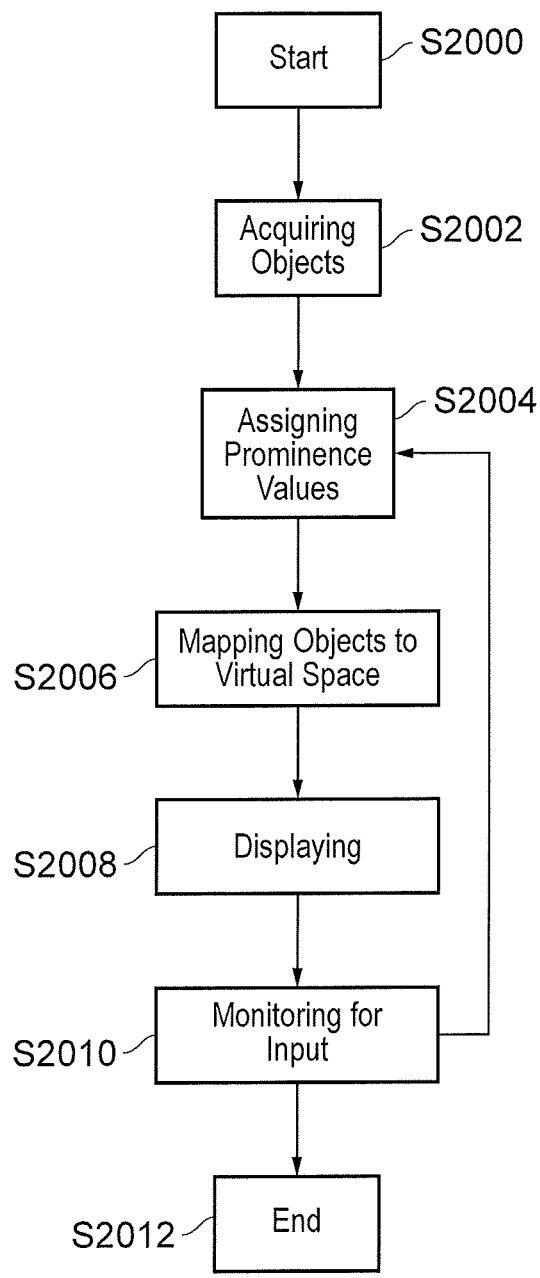
FIG. 20 illustrates a flow chart of a method of mapping an object to a location in a virtual space according to an embodiment of the disclosure.

Navigation Through Virtual Space:

FIG. 20 illustrates a flow chart of a method of mapping an object to a location in a virtual space according to an embodiment of the disclosure.

Steps S2000 to S2006 are the same as steps S1200 to S1206 respectively as described above with reference to FIG. 12A, and so, for brevity, a repetition of those steps will not be included at this stage. Once each object has been mapped to the respective location in the virtual space according to the priority level associated with at least some of the objects and the prominence value assigned to each respective location in the virtual space in step S2006, the method proceeds to step S2008.

Step S2008, comprises displaying the virtual space on a display for viewing by a user. That is, in step S2008 each object of the plurality of objects is displayed on a display at the respective location in the virtual space to which it has been mapped. For example, step S2008 may comprise displaying the virtual space on a two dimensional display. A two-dimensional display may comprise a television screen, a computer screen, an image projected onto a wall from a projector or the like. It will be appreciated that while the display is two-dimensional, the virtual space itself may be either two-dimensional or three-dimensional or be a two-dimensional plane or surface in a three-dimensional environment.

Furthermore, as described above, the plurality of objects could be mapped to respective locations within the three-dimensional virtual space, or could be mapped only to a respective location on a two-dimensional surface within the virtual space (as demonstrated with reference to FIG. 14. This may be advantageous for display on an augmented reality display, where the plurality of objects in the virtual space are mapped to a two-dimensional surface within the virtual space that corresponds to a surface in the real world space. The plurality of objects could be displayed on a wall, floor, table or the like in the real world in accordance with the priority level associated with at least some of the objects and the prominence value assigned to each respective location in the virtual space during step S2004.

Once the virtual space, comprising the plurality of objects mapped to respective locations according to the priority level associated with at least some of the objects and the prominence value assigned to each location in the virtual space has been displayed, the method proceeds to step S2010, which is a step of monitoring for an input. The input could of course relate to an input to move the current viewpoint in the virtual space. In the case of a virtual reality or augmented reality headset, for example, this could correspond to a rotation of the user's head for example, gaze tracking to determine where the user is looking, or a mixture of both of these methods.

However, the input could further relate to an input whereby the user may select an object of the plurality of objects mapped to a respective location in the virtual space as an object of interest out of the plurality of objects mapped to the virtual space. That is, the objects mapped to a respective location in the virtual space could be selectable by as an object of interest. An object of interest could relate to an object upon which the user wishes to perform an action such as obtaining more information, activating, editing or the like. The object of interest could expand in order to accommodate the additional information, or additional information could be displayed around the object of interest, in front of the object of interest or the like. Alternatively or in addition, the additional information regarding the object of interest could be provided in the form of sound, speech or video. For example, in the case that the object relates to a television channel object, the additional information could relate to additional information regarding the program currently playing on that channel or the like. Furthermore, the video could relate to a small window of the currently playing program which could be expanded upon further selection.

In this case, the sound could relate to the sound being broadcast on the channel, or could relate to a speech announcement of the program for example. The additional information may be used to provide an accessibility aid for disabled or impaired users.

The action which the user wishes to perform is not limited in this respect, and will vary depending on the type of object which the object relates. The object of interest may also be an object upon which the user does not wish to perform a further action upon, instead relating to an object which the user has merely expressed an enhanced level of interest in.

The object of interest could be detected by monitoring the gaze of the user through eye tracking and identifying an object as the object of interest when the gaze of the user remains on the object for a time greater than a predetermined time. Alternatively, or in addition, the object could be detected once the user is looking at an object and the user performs an additional input. The additional input could be in the form of a gesture or facial expression, or could be in the form of an input sound. For example, the user could say a predetermined activation word in order that the object which they are currently looking at is detected as the object of interest.

The detection of the object of interest may also comprise the use of an input device. For example, in the case of a display screen such as a television, the user may navigate through the objects using predetermined buttons on a remote control device, and may further select an object as an object of interest by pressing an additional button on the remote control device.

The object which has currently been navigated to, and which may become the object of interest if the user performs an additional input selection, may be indicated to the user in the form of a visual effect. For example, the object may move, rotate, flash or the like. Alternatively or in addition, a box could appear around the object designated as the current object of interest for example.

Once an object of the plurality of objects has been selected as an object of interest, the method could further comprise the method further comprises setting the respective location of that object designated as the object of interest in the virtual space as the reference location. That is, the prominence value assigned to each location in the virtual space could be recalculated in accordance with the selection of the object of interest. Since the prominence value is assigned according to a distance of each location from a reference location in the virtual space and at least one physiological characteristic of a user, changing the reference location in this manner will change the prominence value which has been assigned to each location. For example, if the reference location had previously been set as a central location as demonstrated in FIG. 16, and the user subsequently set an object at location 1608 as an object of interest, then the prominence values around the current object of interest may increase, while the prominence values at the central location may decrease (since they are further from the reference location). However, the central location may still have an elevated prominence level compared to surround respective locations, owing to the at least one physiological characteristic.

Accordingly, if the mapping and display are updated in accordance with the change in assignment of prominence levels, the plurality of objects may be re-mapped to respective locations in the virtual space according to the priority level associated with at least some of the objects and the prominence value assigned to each location in the virtual space. That is, upon detected said input in step S2010, the method could thus return to step S2004. In this manner, the objects of high priority may continue to be placed at the most prominent position in the virtual space in accordance with the selection of an object of interest which further improves the navigation through a large number of objects since the objects which are of higher priority (or increased interest) are mapped to locations within the virtual space having increased prominence; even in a virtual space of limited size.

Alternatively, once an object of the plurality of objects has been selected as an object of interest, the method could further comprise re-mapping at least one of the plurality of objects such that the object of interest is located at the reference location. For example, considering the example in FIG. 18. It may be that the user selects the object at the location 1808 as the object of interest, even though that object was initial placed at a location with decreased prominence compared to an object such as 1810. However, once the user has selected object 1808 as the object of interest, the priority levels associated with the objects could be updated such that the object of interest becomes the object with the highest priority level. Accordingly, once the re-mapping has been performed as described above, according to the priority level associated with at least some of the objects and the prominence value assigned to each location in the virtual space, the object at location 1808, which has been selected as the object of interest, would be re-mapped to the most prominent position in the virtual space. That is, object would then be displayed at the reference location 1800 as opposed to the object previously mapped to that location.

Re-mapping at least one of the plurality of objects such that the object of interest is located at the reference location in this manner, ensures that the object in which the user has indicated a renewed interest in, by selecting the object as the object as interest, is then re-mapped to the location in the virtual space which has the highest level of prominence and to which it is easiest to navigate. In the case that said objects corresponds to a film (movie) object for example, the film selected by the user is consequentially re-mapped to the most natural viewing location for the user. This further improves navigation through the content and improves user experience. Accordingly, even when the space available for providing the user with the plurality of objects is limited, the most pertinent information can be provided to the user. Alternatively, when the object is selected as the object of interest, the method could further comprise generating a second virtual space, wherein a second plurality of objects are mapped to respective locations in the second virtual space and the object of interest is mapped to a reference location in the second virtual space. In other words the selection of an object of the plurality of objects mapped to respective locations in the virtual space as an object of interest according to the present embodiment could open a second virtual space. In the second virtual space, a second plurality of objects could be displayed. This second plurality of objects could overlap with the first plurality of objects in some respect. For example, both the first and second plurality of objects could comprise the object which has been selected as the object of interest by the user. The object of interest would then be mapped to a reference location in this second virtual space (such as the central location most natural to be viewed by a user). That is, the object of interest would be set as the object having the highest priority level in the second virtual space.

Figure 21:
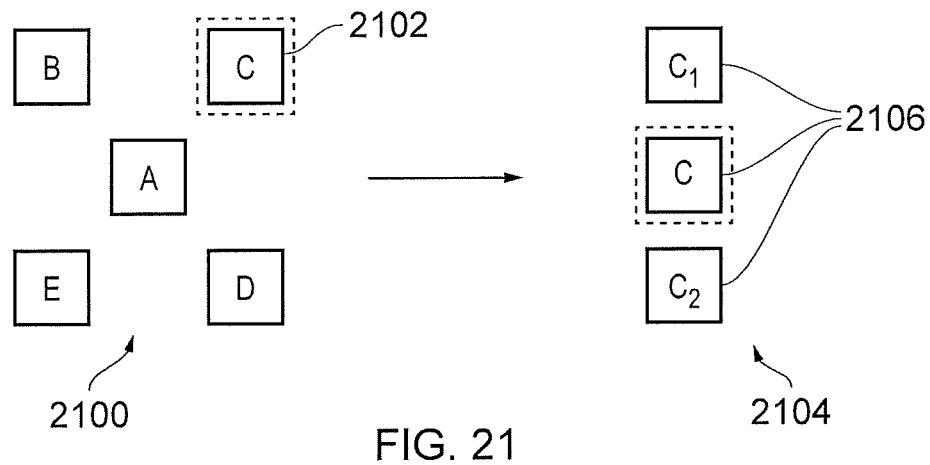
FIG. 21 depicts an example of generating a second virtual space according to embodiments of the disclosure.

FIG. 21 depicts an example of generating a second virtual space according to embodiments of the disclosure. In the first virtual space 2100, a first plurality of objects have been mapped to respective locations within the virtual space according to embodiments of the disclosure. When the user selects object 2102 as the object of interest, a second virtual space 2104 is generated and displayed to the user. A second plurality of objects 2106 are then mapped to respective locations within the second virtual space in accordance with a priority level associated with at least some of the objects and a prominence value assigned to each location in the virtual space (the prominence value being assigned according to a distance of each location from a reference location in the virtual space and at least one physiological characteristic of a user). The user may then navigate through the second plurality of objects as described above.

The second plurality of objects may be related to the first plurality of objects in a certain respect. For example, in the case that the objects relate to television channel objects, the second plurality of objects could relate to other channels from that provider, or programs which are available on that channel for example. Alternatively, where the object relates to a menu object, the second plurality of objects could relate to sub-menus, or further options available in that menu.

By generating a second virtual space in this manner, it is possible to further improve the navigation through a large number of objects displayed in a virtual space. That is, since objects related to the object of interest are re-mapped to a location in a second virtual space in accordance with their associated priority level and the prominence level of that space it becomes easier to navigate to a specific object from the large number of objects in which the user has expressed an interest even where the available virtual space is very limited.

Furthermore, there may be a transition effect to change from the first virtual space to the second virtual space. This could comprise the objects flying in and out of the view of the user, a fade or wipe effect or the like. Performing a transition effect in this manner increases the users experience and level of immersion.

In addition to the above operations regarding the object of interest, the method could further comprise mapping objects which are unavailable to be selected as the object of interest to a respective location at a depth further from the user in the virtual space. That is, for example, if the objects relate to television channel objects, then it may be that while a certain channel is listed, it is not currently available for selection. This may be because the channel is not currently being broadcast on, the service is only available at certain times, or may be because the user does not have certain access rights. These access rights may relate to channels for which the user must pay to access, or may relate to channels which are restricted in accordance with parental control settings or the like. These objects which can not be selected could then be set at an increased depth in the virtual space from the user's view point, such that the user can see that these objects can not be selected before navigating to them. In order to place the object at an increased depth, the priority level of objects unavailable for selection could be reduced. As such, these objects would be re-mapped to locations in the virtual space with reduced levels of prominence. When an object becomes available for selection again, the object could be returned to its previous priority level.

Modifying the prominence level of objects currently unavailable for selection in this manner reduces the likelihood of a user navigating to an object only to find that the object is currently unavailable for selection, thereby reducing the level of user frustration when navigating through a large number of objects mapped to respective locations in the virtual space according to embodiments of the disclosure.

Additional Modifications:

Embodiments of the disclosure provide a method of mapping an object to a location in a virtual space, the method comprising:

acquiring a plurality of objects which are to be mapped to respective locations in a virtual space;

assigning each respective location in the virtual space a prominence value representing the prominence of an object at the location when the virtual space is viewed by a user, the prominence value being assigned according to a distance of each location from a reference location in the virtual space;

mapping each object to a respective location in the virtual space according to a priority level associated with at least some of the objects and the prominence value assigned to each respective location in the virtual space.

In other words, the prominence of the location may be determined by the distance of the location from the reference location alone. The reference location may be the location which is easiest in the virtual space for the user to view, and thus the location having the highest inherent level of prominence to the user. Alternatively, the reference location may relate to a location set by the user as their favourite location in the virtual space or the like.

Advantageous Effects:

By mapping each object to the respective location in the virtual space according to the priority level associated with at least some of the objects and the prominence value assigned to the virtual space, it becomes possible for the user to easily navigate a large number of objects since the objects which are of higher priority (or increased interest) are mapped to locations within the virtual space having increased prominence. User frustration when navigating and accessing a large plurality of digital objects is thus reduced even where the available virtual space or display screen size is limited with respect to the large plurality of digital objects which must be displayed. The disclosure is not limited to these advantages; there may be others.

Mapping Objects to a Location in a Virtual Space in Accordance with a Purchase Value:

A method of mapping an object to a location in a virtual space according to the present embodiment may be applied to the navigation of a user through a large number of digital objects, such as television channels, displayed in a virtual environment. In this example, the object which is determined to be mapped to a given location in the virtual space of a given prominence level, is not determined in accordance with a priority level such as the LCN, but is rather determined in accordance with a purchase value and a received payment.

That is, according to the present embodiment, it is possible for third parties to provide payment for placement of their television channel at a location in the virtual space having a given level of prominence to a user. For example, payment could be made such that a given television channel, content streaming services or application launching icon is placed in the virtual space in a location of high prominence, and the third party providing the payment would known that the television channel would have a certain level of priority or exposure to the user. It will be appreciated that the teachings of the present embodiment are not particularly limited to these objects, but rather can be applied to any of the types of digital object described with reference to FIG. 11 of the present disclosure.

Figures 22A, 23:
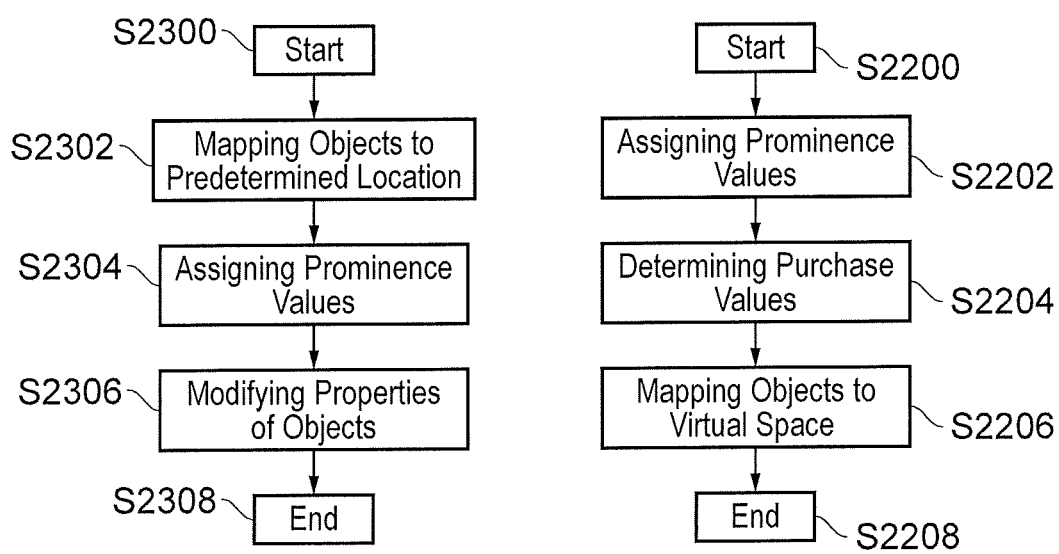
FIG. 22A illustrates a flow chart of a method of mapping an object to a location in a virtual space according to an embodiment of the disclosure.
FIG. 23 illustrates a flow chart of modifying a property of an object located in a virtual space according to an embodiment of the disclosure.

FIG. 22A illustrates a flow chart of a method of mapping an object to a location in a virtual space according to an embodiment of the disclosure. Step S2202 comprises assigning each respective location in a virtual space a prominence value representing the prominence of an object at the location when the virtual space is viewed by a user, the prominence value being assigned according to a distance from each location to a reference location in the virtual space and at least one physiological characteristic of a user. Step S2204, comprises determining a purchase value for each location in the virtual space representing the payment required to place an object at each location in the virtual space, the purchase value being determined at least according to the prominence value assigned to each location in the virtual space. Step S2206 comprises, in response to receiving payment, mapping the object to a location in the virtual space according to the payment information associated with the item of data and the purchase value of each location in the virtual space.

Step S2202 is the same as step S1204 described with reference to FIG. 12A above. For brevity, a repetition regarding the details of this step will not be included at this stage.

The method according to the present embodiment is described in more detail below.

Purchase Value:

Once the prominence value has been assigned to each location in the virtual space, an initial purchase value for each location in the virtual space needs to be determined. As described above, the purchase value relates to the prominence of that location to a user viewing the virtual space. In this manner, the purchase value relates to a value that a third party would pay in order to have an object placed at that location in the virtual space. The value could relate to a purchase value for a given amount of time; that is, an amount of money which would have to be paid to place an object at a given location in the virtual space, determined in accordance with the prominence of that location, for a given amount of time.

The manner by which the initial purchase value is determined is not particularly limited, provided that it is determined in accordance with the prominence value assigned to each location in the virtual space. For example, there could be a tiered system, whereby locations are categorized into regions in accordance with their prominence value. For example, regions of high prominence could be assigned a first purchase value, regions of medium prominence assigned a second purchase value lower than the first purchase value and regions of low prominence assigned a third purchase value. Alternatively, each region could be assigned an individual purchase value in accordance with descending prominence value. Furthermore, there may be a linear mapping between the prominence of the location and the purchase value, or the regions with the highest prominence value could be assigned a premium level of purchase value.

In embodiments, the purchase value may determine the prominence value or actual location. For example an auction may be held with the highest bidder being assigned the highest (available) prominence value or indeed, their choice of location. A next highest bidder may have the next choice of location.

Mapping Objects to Virtual Space:

In response to receiving payment associated with an object, the corresponding object is then mapped to a location in the virtual space in accordance to the payment which has been received. For example, if the payment information indicates that payment corresponds to the purchase value associated with a location of a given prominence value, the object with which that payment is associated will be placed at said location.

It will be appreciated that the payment may be received by any method, and does not need to be received directly by a device used by the user. For example, the payment could be received by a central server, and the device could be notified of that payment. Notably, in response to a payment being received, the object corresponding to that location will be mapped to a respective location in the virtual space according to the payment information associated with the object and the purchase value of each location in the virtual space.

There is no particular restriction upon the type of object which could be used in accordance with the present embodiment. For example, and as described in above, the object could relate to media objects including at least one of television channels, streaming services, games, films (movies), photos, videos, applications which are launchable, or menu options which are selectable by the user or the like. In particular, the object could relate to a sample portion of one of these objects, an advertisement regarding an available object or the like. In the case of television channels the object could, for example, relate to a restricted service such as a subscription channel. The purchase value would then relate to the value to place the restricted service in a location with a given prominence value; even if the user does not have access to that service. Alternatively, the object could relate to a video advert promoting a particular product or service in which the user may have interest. In this case, the purchase value relates to the value to place the video advert at a location in the virtual space with a given prominence value.

Mapping an object to a location in the virtual space according to the present embodiment provides a level of certainty to third parties regarding the level of prominence that an object will have once it is placed in the virtual space in response to a payment. Furthermore, since the number of purchase locations can be restricted in this manner, the method according to the present embodiment ensures that the user can effectively navigate through a large number of objects including purchase value objects.

Furthermore, the virtual space in accordance with the present embodiment could relate solely to purchase value placed objects, or there may be a restricted number of purchase value locations within the virtual space with the remaining locations in the virtual space being assigned objects in accordance with the method described with reference to FIG. 12A. In this manner, the virtual space could comprise a plurality of objects with which the user has expressed interest, and a number of purchase value objects.

Relocation of Objects Upon Expiry of Payments:

As described above, in some embodiments an object mapped to a location in the virtual space may be mapped to that location for a set amount of time. For example, if a payment is received to place an object at a location having a given purchase value then the object will be mapped to that location. However, in embodiments, once a timer associated with that object expires then that object will be removed from the virtual space, or placed at a respective location of low prominence, until a further payment matching the purchase value of the location is received. However, a user may become accustomed to having an object at a certain location in the virtual space, even if that object was initially placed at the prominent location by virtue of received payment information as described above. According to embodiments, the method described with reference to FIG. 22A may further comprise receiving an indication from a user that an object mapped to a first location in the virtual space should be consistently mapped to a predetermined location in the virtual space, and instructing a payment from the purchaser of the first location to the owner of the virtual reality platform or environment.

In other words, the user may indicate that they wish an object to consistently remain at the location to which it has presently been mapped. It will be appreciated that such indication could be performed in a number of ways, and the present disclosure is not particularly limited in this regard. For example, the user may indicate that the object should remain at the present location through an input gesture, speech input, behavioural patterns, use of an input control device or the like. Furthermore, the user could flag the object as an object of interest, or a favourite object to which they wish to return. Upon receiving an indication that the user wishes the object, which has been placed at a given location in the virtual space by virtue of a payment, to remain at that location, a payment request is made to the purchaser of the location. That is, the purchaser is instructed that the user has requested that the object remain at that location, and is informed that, upon receipt of further payment, the object will remain at the purchase location.

If payment is not received from the initial purchaser, then, according to embodiments, the object will be relocated in the virtual space once the initial payment has expired. However, since the user has indicated that the object is a favourite object, the user will be informed of the change in location of that object. For example, the user could be informed that the object has been relocated, and instructed of the new location in the virtual space to which the object has been relocated. Alternatively, the user could be provided with a link to the new location of the object in the virtual space.

Accordingly, even if an object with which a user has expressed interest is relocated to a less prominent location in the virtual space once the payment associated with that object has expired, the user can still efficiently navigate through the virtual space to that object.

Threshold Levels of Interest:

While a user may be ambivalent towards certain purchase objects placed in the virtual space, the user may in fact display a certain level of interest towards other purchase objects. This is particularly likely if the purchase object placed at a given location in the virtual space is particularly attractive to the user in some regard. For example, such object could relate to advert for a purchased television channel or portal showing a sporting event the user is particularly interested in or the like. As described above, there are a number of mechanisms by which the level of interest of a user in a given purchase object can be determined, and the present disclosure is not particularly limited in this regard. In embodiments, the level of interest a user displays in objects which have been mapped to respective locations in the virtual space is monitored and recorded for each object. This could be monitored and recorded continuously, periodically or only when a change in the level of interest has been determined, for example.

According to embodiments of the disclosure, the method according to FIG. 22A further comprises identifying a level of interest of a user in an object at a respective location adjacent to a first location after the user has displayed interest in the object at the first location and determining whether the level of interest displayed by the user in the object at the respective location exceeds a threshold value. When it is determined that the level of interest exceeds the threshold value, the method further comprises instructing a payment to the purchaser of the first location in response to the interest shown in the object at the respective location.

In other words, if a user displays a certain level of interest in a first object, and subsequent to that interest being displayed proceeds to display an increased level of interest in objects at location adjacent to that object in the virtual space, then it is determined that the user is displaying increased levels of interest in those objects located at the respective adjacent locations by virtue of their proximity to the first object in which the object has displayed an increased level of interest. Furthermore, the proximity of those objects to the object in which the user has expressed a certain level of interest may effectively detract from the prominence of the first object. Accordingly, the owner of the objects at respective locations adjacent to the first object are instructed to make a payment to the owner of the first object in compensation for the reduction in prominence.

It will be appreciated that the manner by which the payment is made in response to the determination is not particularly limited. For example, such payment could be made directly between the third parties in the form of a micropayment or payment in kind. Alternatively, the payment could be made via the owner of the virtual space. Furthermore, in some embodiments, the payment could represent a single one off payment relative to the increase in the level of interest, while alternatively, a micropayment or the like could be instructed each time the user visits, accesses or displays an increased level of interest in an object adjacent to the object at the prominent location in which the user has displayed a certain level of interest.

It will be appreciated that the threshold level may be set by any mechanism dependent upon the situation, and is not particularly limited in this regard. However, in embodiments, the threshold level of interest could be set independently for each object based upon the previous levels of interest the user has displayed in an object. Thus, any significant increase in the interest the user displays in a location adjacent to an object of high prominence in which the user has displayed a certain level of interest, can be determined to be triggered by the proximity to the object in which the user has displayed a certain level of interest.

Determination of the threshold levels of interest according to embodiments of the disclosure may restrict the opportunities of third parties to (unfairly) capitalise upon and detract from the prominence of an object placed by a competitor, thus providing an increased level of certainty to a purchaser that a given object for which payment is received will achieve a certain degree of prominence and exposure to the user.

Modification of Initial Purchase Value:

While the initial purchase value which is assigned to each respective location in the virtual space is determined in accordance with the given prominence of that location by virtue of the distance from a reference location and at least one physiological characteristic as described above, it will be appreciated that the purchase value of each respective location is not fixed to this initial purchase value but rather may vary in accordance with a number of factors. For example, the purchase value assigned to a given region or location could vary if the prominence of that location is determined to have changed. For example, if the reference location is changed then the purchase value of the respective regions will be updated accordingly. By means of a further example, if the user recalibrates the physiological characteristic (changing from a default value to a value tailored for that user) then the purchase value assigned to each respective location in the virtual space will be updated accordingly.

Furthermore, the purchase value assigned to a region of a given prominence could also vary in response to demand. For example, if a large number of third parties are interested in placing an object at a given location in the virtual space, the purchase value of that location could increase accordingly. Alternatively or in addition, the purchase value could vary in response to the total number of objects which have been placed in the virtual space. That is, if the number of remaining available locations for placement of an object in the virtual space is low, then the purchase value of those available locations will be increased accordingly.

It will be appreciated that initially, while purchase values may have been assigned to the respective locations in the virtual space, the number of objects actually mapped to those respective locations may be low or even zero. That is, until payment has been received no object will be mapped to those respective locations in the virtual space. Moreover, as described above, even if a payment is received such that an object is placed at a location in the virtual space, it may be that the placement is time limited, such that after a period of time has expired the object will be removed from that location. An occupation status can therefore be assigned to each respective location in the virtual space, indicating whether or not payment that respective location is occupied by an object. Initially, before objects have been placed in the virtual space, the occupation status of the respective locations in the virtual space will be empty. As objects are subsequently placed in the virtual space, in response to payments being received, the occupation status of the respective locations in the virtual space will therefore change to indicate that the respective locations are occupied.

According to embodiments of the disclosure, the purchase value assigned to a respective location in the virtual space may also vary once objects have been mapped to respective locations in the virtual space. That is, the method according to FIG. 22A may further comprise a step of monitoring an occupation status of a first location in the virtual space, and modifying the purchase value of one or more respective locations adjacent to the first location when the occupation status of the first location changes.

Figure 22B:
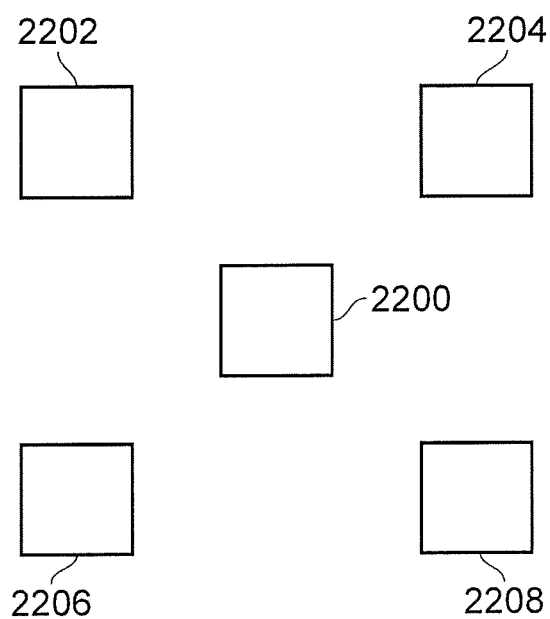
FIG. 22B depicts an exemplary configuration of purchase locations through a virtual space in accordance with embodiments of the disclosure.

FIG. 22B depicts an exemplary configuration of purchase locations through a virtual space in accordance with embodiments of the disclosure. In this example, the occupation status of locations 2200, 2202, 2204, 2206 and 2208 is initially empty. Accordingly, these regions have been assigned initial purchase values in accordance with embodiments of the disclosure. Consider then that a payment is received to place an object at location 2200, such that an object is mapped to this location and the occupation status of location 2200 changes from empty to occupied. Upon determination that the occupation status of location 2200 has changed, the purchase values assigned to locations 2202, 2204, 2206 and 2208 will be modified. That is, the purchase value of these locations may change from the initial purchase value in accordance with the change of the occupation status of location 2200.

It will further be appreciated that while the modification of purchase values is described with reference to a change in the occupation status of location 2200, a change in occupation status of any of the locations 2202, 2204, 2206 or 2208 may also cause a modification in the purchase locations of the adjacent locations within the virtual space. The magnitude of the change in purchase value may depend upon a distance in the virtual space between the respective locations and the location for which the occupation status has changed. For example, the purchase value of location 2208 may be unchanged, or changed by a lesser amount than location 2200, following a change in occupation status of location 2202.

By modifying the purchase value of the respective locations adjacent to a first location upon a change of the occupation status of the first location in this manner according to embodiments of the disclosure, it is possible to obtain an adaptive distribution of the purchase value throughout the virtual space which reflects the true prominence of that location to a give user.

The mechanism by which the purchase value of a location is modified following a change in the occupation of a first location may vary depending upon given situations. For example, in one such situation, the modification of the purchase value of the one or more respective locations adjacent to the first location may be based on the object that has been mapped to the first location when the occupation status of the first location changes. That is, consider that the occupation status of location 2200 changes from empty to occupied in accordance with a payment being received. The amount by which the purchase value of respective locations 2202, 2204, 2206 and 2208 changes may depend upon the object which has been mapped to location 2200 in the virtual space. For example, if the object mapped to location 2200 in the virtual space is an advert for a particularly high value or attractive commodity, then the modification of the purchase value of adjacent locations 2202, 2204, 2206 and 2208 following the change of occupation status of location 2200 will be large. In contrast, if the object mapped to location 2200 is an advert for a less attractive commodity, then the modification in the purchase value of location 2202, 2204, 2206 and 2208 will be relatively small in comparison.

Furthermore, it will be appreciated that the purchase value of respective locations may also be modified if the occupation status of a first location changes from occupied to empty, following the expiry of a time period for which a payment has been made to place an object at a respective location in the virtual space. That is, those respective regions may return to their initial purchase value for example, or may simply be reduced by an amount determined by the type of object which was placed at the first location.

In embodiments, the modification of the purchase value of the one or more respective locations adjacent to the first location may further be based on the identity of an intended purchaser of the one or more respective locations in the virtual space. That is, consider that an object has been mapped to location 2200 in the virtual space, such that the occupation status of that location changes from empty to occupied. If the object mapped to location 2200 is an advert for a particularly attractive object, such as a new car, then the purchase values of the respective locations 2202, 2204, 2206 and 2208 will increase accordingly. Furthermore, if a third party who also sells cars subsequently attempts to purchase location 2202 to place an advert in the virtual space adjacent to location 2200, then the purchase value of 2202 may further increase owing to the particular beneficial effect the third party will experience from having their own advert placed adjacent to the initial car advert at 2200. In contrast, if a third party who does not sell cars, or sells only items entirely unrelated to the object placed at the first location, attempts to purchase location 2202 to place an advert in the virtual space, then the purchase location of that object may only increase by a small amount. In other words, the identity of the third party attempting to purchase subsequent locations in the virtual space adjacent following the purchase of a first location in the virtual space may further modify the purchase value of the respective adjacent locations. It will be appreciated that the present disclosure is not particularly limited to the specific example described above, and any modification of the purchase values of respective locations based upon the identify of the subsequent intended purchaser may be applied in accordance with the present disclosure.

Alternatively or in addition, the purchase value of the one or more respective locations adjacent to the first location may also be based upon the object intended to be mapped to those respective locations by the intended purchaser. For example, regardless of the identity of the intended purchaser, the purchase value may be modified depending on the similarity between the object which has been placed at the first location and the object which is intended to be placed at the subsequent location in the virtual space. That is, even if the third party intending to purchase a location in the virtual space adjacent to a first occupied location does not typically trade in commodities which would benefit from being nearby the object mapped to the first location, yet the specific object which they are seeking to place in the virtual space is in fact an object which would benefit from this proximity, then the purchase value of the respective adjacent location can be modified accordingly. Conversely, if the third party intending to purchase a location in the virtual space adjacent to a first occupied location frequently trades in commodities which would benefit from being nearby the object mapped to the first location, yet the specific object which they are seeking to place in the virtual space is an object which would not benefit from the proximity, then the purchase value of the respective adjacent location may be modified by a smaller amount from the initial purchase value.

In embodiments of the disclosure, the purchase value of the one or more respective adjacent locations 2202, 2204, 2206 and 2208 could be modified in accordance with the level of interest which has been displayed in the object mapped to the first location of user being target users for the object intended for placement at the one or more respective locations by an intended purchaser. In other words, the more interest which is displayed in the first object by a user or users who is or are likely to be interested in the object which is intended to be placed at the one or more respective adjacent locations, the greater the modification of the purchase value of those respective locations from the initial purchase value of those respective locations will be.

It will be appreciated that there are numerous ways to determine the level of interest of a user in the object which has been placed at the first location. For example, it could be determined by the number of times a user accesses the object placed at the first location, an analysis of the gaze pattern of a user, the number of links or references the user makes to the object when communicating with other users or the like. In the specific example of an advertisement placed in the virtual space, the level of interest could further be determined based upon the number of purchases the user has made based on the advert, or based upon whether the user follows the advert to an online retailer for example. Any number of measures, or combinations of these measures, of the level of interest may be used in accordance with the present disclosure.

According to embodiments of the disclosure, the method, may comprise identifying a level of interest in an object at a first location, and modifying the purchase value of locations adjacent to the first location based on an identified level interest in the object at a first location. For example, when it is determined that the object at the first location is an object with a high level of interests, the purchase value of locations adjacent to the first location may be increased accordingly.

The impact of the level of interest the user or users have displayed in the first object upon the purchase value of respective locations in the virtual space adjacent to that first location may be modulated in accordance with the compatibility of that object with the object which is subsequently intended to be placed in the virtual space adjacent to that first object. For example, if an advert for a highly attractive object such as a car is placed at location 2200, and the user or users have displayed a high level of interest in that advert (such as by watching the advert a significant number of times) then the purchase values of respective adjacent locations 2202, 2204, 2206 and 2208 will be modified accordingly. However, the increase in the purchase values of these respective locations will be greater if the intended object to be placed at those respective locations is closely related to cars (such as other car adverts, adverts for car accessories, adverts for driving experiences or the like) owing to the inherent benefit the intended object will obtain by virtue of its proximity to the car advert at the first location. In contrast, if the intended object to be placed at those respective locations is not closely related to cars (such as adverts for articles of clothing, adverts for household products, adverts for restaurants or the like) then the increase in the purchase value of those respective locations will be lower, reflecting the lower level of benefit those objects would obtain from the proximity to the car advert placed at the first location.

It will be appreciated that the present embodiment is not so limited to this specific example, and any such method of modifying the purchase value of adjacent locations in accordance with the level of interest which has been displayed in the object mapped to the first location of user being target users for the object intended for placement at the one or more respective locations by an intended purchaser can be used in accordance with the present disclosure.

Furthermore, the purchase value of the one or more respective locations adjacent to the first location may be modified based on the popularity of the object that has been mapped to the first location in the virtual space, when the occupation status of the first location changes. The popularity of an object indicates the amount that the object is appreciated or enjoyed by a user or users. That is, if the object has higher popularity it is an object which is greatly appreciated by a user or users. The placement of an object of high popularity in the virtual space will increase the purchase value of those locations adjacent to the location of that object in comparison to their initial value. In contrast, the placement of an object of lower popularity in the virtual space will cause a less significant increase in the purchase value of the locations adjacent to that object, or could even cause the purchase value of those locations to decrease owing to their proximity and association with an object of low popularity.

There are a number of ways by which the popularity of an object which has been placed in the virtual space can be determined. For example, it could be that the popularity of the object is determined in accordance with content linked to that object. Consider the case whereby the object is an advertisement for a film (movie) and that object is linked to a website for reviewing films (movies). In embodiments, the popularity of the object could be determined based upon the number of positive reviews the film (movie) has received on the review website. Alternatively, the object could be linked to a page on a user's social media profile, and the popularity of the object could be determined based upon opinion's the user has expressed about the object on their profile.

Alternatively or in addition, the popularity of the object could be determined based upon a number of subscribers or purchasers or expressions of interest such as 'likes' or ratings or users 'following' and object or organisation on other platforms related to the object mapped to the location in the virtual space. For example, where the object is an advert for a product, the popularity of that product could be determined based upon the number of sales of that product, or representative products linked to that product, on an online shopping forum or forums. Alternatively, where the object is an advert which relates to a service such as a subscription based television channel, the popularity of that object could be determined in accordance with the number of users which have subscribed to that television channel. The determination of the popularity of such an object need not be limited to subscribers who are also users of the virtual space. Rather, the number of subscribers for that television channel could be determined based upon the number of subscribers to that television channel on a different platform.

Additional Modifications:

Embodiments of the disclosure provide a method of mapping an object to a location in a virtual space comprising:

determining a purchase value for available locations in the virtual space, the purchase value representing a payment required to place the object at available locations in the virtual space, the purchase value being determined according to an available location's prominence in virtual space and according with a level of popularity of one or more objects placed at one or more locations adjacent to the available locations; and in response to receiving a payment for a location in the virtual space, mapping the object to that location in the virtual space.

In other words, the method according to embodiments of the disclosure may comprise determining the purchase value required to place an object at a location in the virtual space for the locations in the virtual space which are available for the placement of the object. Certain locations within the virtual space may always be unavailable (such as restricted regions or the like) while other regions may be unavailable only temporarily (if they are already occupied by another object for example).

The purchase value may be determined based on the location's prominence in the virtual space (such as the distance from a reference location or the like) and also based upon a level of popularity of objects in locations adjacent to the location. That is, the popularity of the objects in adjacent locations may be based on the level of interest displayed in those objects (as described above), or may be based on a popularity score provided by the user regarding the objects at the adjacent locations. For example, if the objects in the adjacent locations have a higher level of popularity, then the purchase value for the location in the virtual space will be increased accordingly.

Furthermore, embodiments of the disclosure provide a method of mapping an object to a location in a virtual space, the method comprising:

assigning to locations in the virtual space a prominence value representing the prominence of an object at the location when the virtual space is viewed by a user, the prominence value being assigned according to a distance from each location to a reference location in the virtual space;

determining a purchase value for the locations in the virtual space representing a payment required to place an object at respective locations in the virtual space, the purchase value being determined at least according to the prominence value assigned to a respective location in the virtual space; and in response to receiving the payment for a location in the virtual space, mapping the object to that location in the virtual space.

In other words, the purchase value for locations in the virtual space may be determined based upon the prominence of the location determined by the distance of the location from the reference location alone. The reference location may be the location which is easiest in the virtual space for the user to view, and thus the location having the highest inherent level of prominence to the user. Alternatively, the reference location may relate to a location set by the user as their favourite location in the virtual space or the like.

The disclosure relates to an apparatus, system and computer interpretable code instructions for performing the above. Embodiments provide that purchase value is related not only to its visibility in virtual space by a user for example at an entry point in the virtual space or a natural eye level, but also according to what other objects are positioned adjacent to an intended location.

It will be appreciated that the present disclosure is not so limited to these above described examples, and any method of determining the popularity of the object in accordance with content linked to that object can be used in accordance with the present disclosure. Furthermore, while numerous specific examples of the modification of the purchase value of respective locations in the virtual space have been described, it will be appreciated that any method of modifying the purchase value of one or more respective locations adjacent to a first location when the occupation status of the first location changes may be used in accordance with the present disclosure.

Advantageous Effects:

Through the modification of purchase values of respective adjacent locations in the virtual space following the mapping of an object to a location within that virtual space, it is possible to restrict the opportunities of third parties to (unfairly) capitalise upon the prominence of a competitor, thus providing an increased level of certainty to a purchaser that a given object for which payment is received will achieve a certain degree of prominence and exposure to the user.

Furthermore, by mapping an object to a respective location in the virtual space according to a purchase value and received payment information, it becomes possible to ensure that a given object for which the payment is received will have a certain degree of prominence and exposure to the user, even when a large number of objects are displayed in the virtual space on a screen or virtual space of limited size. Thus, it becomes easier to enable objects that are more likely to be desirable to a user to be found in a virtual environment of limited available space. The disclosure is not limited to these advantages; there may be others.

Modification of Objects Mapped to a Location in a Virtual Space:

A method of mapping an object to a location in a virtual space according to the present embodiment may be applied to the navigation of a user through a large number of digital objects, such as television channels, displayed in a virtual environment. In an example, a television object may be mapped to predetermined location in the virtual space. This location may be any location in the virtual space, and the predetermined location can be assigned with user preference. For example, the user may have defined that a certain television channel should be located at a location a certain distance from the central location in the virtual space along the horizontal axis. The prominence of the locations in the virtual space are then determined, as described with reference to FIG. 12A. In this example, if it is determined that the object at that location has a very low level of prominence to the user, properties of that object are modified in order that the user remains aware of that object. In this example, these properties relate to the size of the object, and an object at a location in the virtual space with a low level of prominence is thus expanded such that the attention of the user is drawn towards that object.

FIG. 23 illustrates a flow chart of modifying a property of an object located in a virtual space according to an embodiment of the disclosure.

Step S2302 comprises mapping an object to a predetermined location in a virtual space. Step S2304 comprises assigning each respective location in a virtual space a prominence value representing the prominence of an object at the location when the virtual space is viewed by a user, the prominence value being assigned according to a distance from each location to a reference location in the virtual space and at least one physiological characteristic of a user.

Step S2306 comprises modifying at least one property of the object located in the virtual space in accordance with the prominence value assigned to the location of the object in the virtual space.

Step S2304 is the same as step S1204 described with reference to FIG. 12A above. For brevity, a repetition regarding the details of this step will not be included at this stage.

The method according to the present embodiment is described in more detail below.

Mapping an Object to a Predetermined Location:

When mapping an object to a predetermined location in the virtual space as according to the present embodiment, the location of an object in a virtual space is dictated by location information, and that location information can be set in advance. The location information could, for example, relate to co-ordinates which define where in the virtual space the object is to be placed. Alternatively, any method of defining a location of the object in the virtual space may be used. Furthermore, any number of objects may be placed in the virtual space in this manner, provided that at least one object is placed in the virtual space. These objects may be placed in the virtual space at the same time or at a respective time for each object.

Furthermore, as described with reference to FIG. 11, there is no particular restriction upon the type of digital object which may be placed within the virtual space according to the present disclosure.

Modification of Object Properties:

Once the prominence value has been assigned to each respective location in the virtual space as according to the present embodiment, the method further comprises modifying a property of that object in accordance with the prominence value. The manner by which the property of the object is modified in accordance with prominence value is not particularly limited. For example, the property of the object could be enhanced if the object is placed at a high prominence location, or the property of the object could be reduced if the object is placed at a high prominence location in the virtual space.

Furthermore, according to embodiments of the disclosure, the object could have media content associated with itself. As such modifying a property of the object according to the present embodiment could further comprises changing the media content associated with the object, or modifying a property of the media content associated with the object. That is, if the object is in a location which has been assigned a first prominence value then the object could have a first media content associated with itself, wherein if the object is located at a location having a lower level of prominence, the media content could be changed to a second media content.

For example, if the object relates to a television channel, and that object is located in an area of low prominence, then there may be no media content associated with that object, or a short sample clip of a currently playing program on that channel could be displayed. However, if the object is placed at a location of high prominence, then the media content associated with that object could be changed such that a live stream of the channel is played and displayed in accordance with that object.

With regards to the property of the object, or the property of media content associated with that object, it will be appreciated that said property is not particularly restricted. For example, the property could be one of a visual property, audio property or animation property. Other properties of the object, or media content associated with the object, could be modified in accordance with the present disclosure. It will also be understood that any combination of these properties could be modified in accordance with the prominence of the location at which the object is located in accordance with the present disclosure.

Consider the case where the property is a visual property. Said visual property could include a size, an aspect ratio, a colour, a transparency level, a brightness level, a shape, or a texture mapping or the like. That is, for example, if the object is located at a location within the virtual space with a low level of prominence to the user, a visual property of the object, such as its aspect ratio, could be increased. In this manner, when the visual space is displayed, the attention of the user could be drawn to the object, even though the object is placed in a position of low prominence.

It may be, however, that if the object is placed at a location having a lower level of prominence, a visual property of the object is decreased. That is, the aspect ratio of the object could be reduced if the object is placed at a respective location which has been assigned a low level of prominence. In this manner, even if a very large number of objects are placed within the virtual space, the virtual space can be prevented from becoming overly cluttered. Accordingly, navigation through a large number of objects in a virtual space can be improved, since objects which are placed at less prominent locations would have a decreased level of attractiveness to the user. This avoids a situation whereby the user becomes overwhelmed with the number of objects which are available in virtual space.

An audio property of the object, or media content associated with the object, could include an audio volume, an audio pitch, an audio frequency balance, or an audio speed or the like. For example, considering a case whereby the objects relate to television channel objects, an object placed in a prominent location could have an increased audio volume, such that the user can hear the audio associated with the object located in a prominent location. Alternatively or in addition, the audio volume associated with an object in a location of low prominence to the user could have the volume reduced or muted. As such, the audio associated with objects in a position of low prominence (and with which the user may have little interest) can be avoided from overwhelming the audio from the more well suited objects located at a location of higher prominence.

An animation property of an object, or media content associated with the object, could include one of a movement, a rotation, a distortion, an animation effect or the like. For example, if the object is located at a region having a lower level of prominence, then the object could be animated in a manner in order to draw the user's attention to that object regardless of the fact that it is located in a less prominent position. Such animation could involve a pulsation of the object, a movement of the object along a predetermined path or the like.

Advantageous Effects:

According to the present embodiment, the navigation through a large volume of digital content can be improved, since the attention of a user can be directed towards objects even if those objects are located in regions having a low degree of prominence to the user. Thus, navigation through a large volume of digital content can be improved even where the available virtual space for display is particularly small or limited with regards to the volume of digital content which must be displayed. The disclosure is not limited to these advantages; there may be others.

Additional Modifications:

Embodiments of the disclosure provide a method of modifying a property of an object located in a virtual space, the method comprising:

mapping an object to a predetermined location in a virtual space;

assigning each respective location in the virtual space a prominence value representing the prominence of an object at the location when the virtual space is viewed by a user, the prominence value being assigned according to a distance from each location to a reference location in the virtual space;

modifying at least one property of the object located in the virtual space in accordance with the prominence value assigned to the location of the object in the virtual space.

In other words, the prominence of the location may be determined by the distance of the location from the reference location alone. The reference location may be the location which is easiest in the virtual space for the user to view, and thus the location having the highest inherent level of prominence to the user. Alternatively, the reference location may relate to a location set by the user as their favourite location in the virtual space or the like.

In addition to the above described embodiments, the property of the object could further be modified in accordance with a type of object which the user has selected as an object of interest (the object being selected as an object of interest as described with reference to FIG. 18 above). That is, if for example, the user has selected a first type of object as an object of interest, then other objects related to that type could have their properties modified in order to draw the user's attention to other objects within the virtual space with which they may be interested. The level by which the property of the related objects is modified could vary in accordance with the prominence of the location at which the object is located. For example, an object located in a region of low prominence may require a large modification of its properties in order to inform a user of its presence, while an object located at a location having a higher prominence level would require only a small modification of its property in order to inform a user of its presence.

Alternatively or in addition, the method of assigning each respective location in the virtual space a prominence value could further comprise assigning the prominence value in accordance with a distance of each location from an object of high priority which has been mapped to a respective location in the virtual space. In other words, in addition to the respective distance of each location from a reference location and the one or more physiological characteristics of the user, the method according to embodiments of the disclosure may further comprise accounting for the respective distance of an object at each location from an object of high priority. That is, the prominence value assigned to each location could be reassessed once the plurality of objects have been mapped to their respective locations within the virtual space.

For example, considering the example in FIG. 18, the prominence value of an object at location 1808 could be considered to be enhanced owing to its proximity to objects of high priority 1810 and 1812. Once the prominence values have been reassessed in this manner, the objects could be re-mapped in accordance with to the priority level associated with at least some of the objects and the prominence value assigned to each location in the virtual space further improving the ability of a user to navigate through a large volume of digital content, since the objects of higher priority are mapped to locations within the virtual space having increased prominence to the user.

Furthermore, the property of the object could be further modified in accordance with a purchase value. That is, if an object is located at a lower degree of prominence, and payment information is received associated with that object, then a property of that object could be increased in order to draw the attention of the user to that object, even if the object remains at a location having a lower degree of prominence. The level of modification of the property in order to draw the attention of the user to that object could be determined in accordance with the level of prominence of the location at which the object is located.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of mapping an object to a location in a virtual space, the method comprising:
assigning, to locations in the virtual space by processing circuitry of a processing device, a prominence value representing prominence of each location for the object when the virtual space is displayed on a virtual equipment device that receives, from the processing device, a video signal corresponding to the virtual space, the prominence value being assigned according to a distance from each location to a reference location in the virtual space corresponding to a location of a user and a range of motion of a neck of the user and according to a distance from each location to other locations having a prominence value above a predetermined threshold;
determining, by the processing circuitry, a purchase value for the locations in the virtual space representing a payment required to place an object at respective locations in the virtual space, the purchase value being determined at least according to the prominence value assigned to a respective location in the virtual space based on the distance from each location to the reference location and based on the range of motion of the neck of the user; and
in response to receiving the payment for a location in the virtual space, mapping, by the processing circuitry, the object to the location in the virtual space,
wherein the purchase value is further determined based on a distance from each location to a second location of a popular object in the virtual space and a category of the popular object such that a purchase value is increased to a second purchase value when the popular object is in a same category as the object, and when the popular object is in a different category than the object, the purchase value is not modified to any higher purchase value than the second purchase value.

2. The method according to claim 1, wherein the prominence value is assigned such that distribution of prominence values for objects around the reference location is non-isotropic.

3. The method according to claim 1 wherein the object mapped to the location in the virtual space is an advertisement.

4. The method according to claim 1, further comprising:
receiving an indication from the user that an object mapped to a first location in the virtual space should be consistently mapped to a predetermined location in the virtual space; and
in response to receiving the indication from the user, instructing a payment from a purchaser of the first location.

5. The method according to claim 1, further comprising:
identifying a level of interest of the user in an object at a respective location adjacent to a first location after the user has displayed interest in an object at the first location;
determining whether the level of interest of the user in the object at the respective location exceeds a threshold level;
wherein when the level of interest is determined to exceed the threshold level, the method further comprises instructing a payment to a purchaser of the first location in response to the level of interest shown in the object at the respective location.

6. The method according to claim 1, further comprising monitoring an occupation status of a first location in the virtual space, and modifying the purchase value of one or more respective locations adjacent to the first location when the occupation status of the first location changes.

7. The method according to claim 6, wherein the modification of the purchase value of the one or more respective locations adjacent to the first location is based on an object that has been mapped to the first location when the occupation status of the first location changes.

8. The method according to claim 7, wherein the modification of the purchase value of the one or more of the respective locations adjacent to the first location is further based on an identity of an intended purchaser of the one or more respective locations.

9. The method according to claim 7, wherein the modification of the purchase value of the one or more of the respective locations adjacent to the first location is further based on an object intended for placement at the one or more respective locations by an intended purchaser.

10. The method according to claim 7, wherein the modification of the purchase value of the one or more of the respective locations is contingent on a level of interest displayed in the object mapped to the first location of target users for an object intended for placement at the one or more respective locations by an intended purchaser.

11. The method according to claim 6, wherein the purchase value of the one or more respective locations adjacent to the first location is modified based on popularity of an object that has been mapped to the first location when the occupation status of the first location changes.

12. The method according to claim 11 wherein the popularity of the object that has been mapped to the first location when the occupation status of the first location changes is determined according to a content item linked to the object.

13. The method according to claim 11, wherein the popularity of the object that has been mapped to the first location when the occupation status of the first location changes is determined according to a number of subscribers, purchasers, or expressions of interest on other platforms related to the object mapped to the first location.

14. The method according to claim 11, wherein the popularity of the object that has been mapped to the first location when the occupation status of the first location changes is determined relative to popularity of other objects mapped to respective locations in the virtual space.

15. The method according to claim 1, comprising:
identifying a level of interest in an object at a first location, and
modifying the purchase value of locations adjacent to the first location based on an identified level interest in the object at the first location.

16. An apparatus for mapping an object to a location in a virtual space, the apparatus comprising:
circuitry configured to:
assign to locations in the virtual space a prominence value representing prominence of each location for the object when the virtual space is displayed on a virtual equipment device that receives, from the apparatus, a video signal corresponding to the virtual space, the prominence value being assigned according to a distance from each location to a reference location in the virtual space corresponding to a location of a user and a range of motion of a neck of the user and according to a distance from each location to other locations having a prominence value above a predetermined threshold;
determine a purchase value for the locations in the virtual space representing a payment required to place an object at respective locations in the virtual space, the purchase value being determined at least according to the prominence value assigned to a respective location in the virtual space based on the distance from each location to the reference location and based on the range of motion of the neck of the user; and
in response to receiving the payment for a location in the virtual space, map the object to the location in the virtual space,
wherein the purchase value is further determined based on a distance from each location to a second location of a popular object in the virtual space and a category of the popular object such that a purchase value is increased to a second purchase value when the popular object is in a same category as the object, and when the popular object is in a different category than the object, the purchase value is not modified to any higher purchase value than the second purchase value.

17. A non-transitory computer readable medium having instructions stored therein, which, when executed by a computer, cause the computer to perform the method according to claim 1.

18. A method of mapping an object to a location in a virtual space comprising:
determining, by processing circuitry of a processing device, a purchase value for available locations in the virtual space, the purchase value representing a payment required to place the object at an available location in the virtual space, the purchase value being determined according to prominence of the available location in the virtual space and according to a level of popularity of one or more objects placed at one or more locations adjacent to the available location in the virtual space, the prominence value being assigned according to a distance from each location to a reference location in the virtual space corresponding to a location of a user and according to a distance from each location to other locations having a prominence value above a predetermined threshold; and
in response to receiving a payment for the available location in the virtual space, mapping, by the processing circuitry, the object to the available location in the virtual space, wherein
the virtual space is displayed on a virtual equipment device that receives, from the processing device, a video signal corresponding to the virtual space,
wherein the purchase value is further determined based on a distance from each location to a second location of a popular object in the virtual space and a category of the popular object such that a purchase value is increased to a second purchase value when the popular object is in a same category as the object, and when the popular object is in a different category than the object, the purchase value is not modified to any higher purchase value than the second purchase value.

19. A method of mapping an object to a location in a virtual space, the method comprising:
assigning, by processing circuitry of a processing device to locations in the virtual space, a prominence value representing prominence of each location for the object when the virtual space is displayed on a virtual equipment device that receives a video signal from the processing device corresponding to the virtual space, the prominence value being assigned according to a distance from each location to a reference location in the virtual space corresponding to a location of a user and according to a distance from each location to other locations having a prominence value above a predetermined threshold;
determining a purchase value for the locations in the virtual space representing a payment required to place an object at respective locations in the virtual space, the purchase value being determined at least according to the prominence value assigned to a respective location in the virtual space based on the distance from each location to the reference location in the virtual space; and
in response to receiving the payment for a location in the virtual space, mapping the object to the location in the virtual space, wherein the purchase value is further determined based on a distance from each location to a second location of a popular object in the virtual space and a category of the popular object such that a purchase value is increased to a second purchase value when the popular object is in a same category as the object, and when the popular object is in a different category than the object, the purchase value is not modified to any higher purchase value than the second purchase value.

\* \* \* \* \*